United States Patent
Yang et al.

(10) Patent No.: US 11,020,664 B2
(45) Date of Patent: Jun. 1, 2021

(54) METHOD AND APPARATUS FOR OBTAINING VIRTUAL RESOURCE OF VIRTUAL OBJECT

(71) Applicant: TENCENT TECHNOLOGY (SHENZHEN) COMPANY LIMITED, Shenzhen (CN)

(72) Inventors: Leina Yang, Shenzhen (CN); Guoqian Yang, Shenzhen (CN); Haosu Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/298,306

(22) Filed: Mar. 11, 2019

(65) Prior Publication Data
US 2019/0201789 A1 Jul. 4, 2019

Related U.S. Application Data

(63) Continuation of application No. PCT/CN2017/111182, filed on Nov. 15, 2017.

(30) Foreign Application Priority Data

Dec. 6, 2016 (CN) .......................... 201611110496.3
Dec. 6, 2016 (CN) .......................... 201611110500.6

(51) Int. Cl.
 *A63F 13/55* (2014.01)
 *G06F 3/0482* (2013.01)
 (Continued)

(52) U.S. Cl.
 CPC .............. *A63F 13/55* (2014.09); *A63F 13/53* (2014.09); *A63F 13/833* (2014.09);
 (Continued)

(58) Field of Classification Search
 CPC ..................................................... A63F 13/422
 See application file for complete search history.

(56) References Cited

U.S. PATENT DOCUMENTS 8,753,211 B2 * 6/2014 Takagi .................... A63F 13/12
 463/31
2013/0097056 A1 4/2013 Sun et al.
2014/0128166 A1 5/2014 Tam et al.

FOREIGN PATENT DOCUMENTS

CN  101308562 A  11/2008
CN  101681483 A  3/2010
(Continued)

OTHER PUBLICATIONS

CN Office Action dated Apr. 16, 2016 in CN application No. 201611110496.3 with partial English categories, 6 pages.
(Continued)

*Primary Examiner* — David L Lewis
*Assistant Examiner* — Robert E Mosser
(74) *Attorney, Agent, or Firm* — Oblon, McClelland, Maier & Neustadt, L.L.P.

(57) ABSTRACT

A method for obtaining a virtual resource of a virtual object is described. Circuitry of an apparatus identifies the virtual object that is currently operated in a virtual domain accessed by executing a target application, where the target application is installed on a user device. The circuitry determines a resource assisting manner of the virtual object, and determines, according to the determined resource assisting manner, at least one virtual resource that meets an assisting condition. The circuitry further displays an icon corresponding to the resource assisting manner and an icon corresponding to the at least one virtual resource that meets the assisting condition on an application interface of the user device, where the at least one virtual resource that meets the
(Continued)

assisting condition is obtainable by the virtual object through the application interface.

20 Claims, 11 Drawing Sheets

(51) Int. Cl.
| | |
|---|---|
| *A63F 13/53* | (2014.01) |
| *G06F 16/9535* | (2019.01) |
| *G06F 3/0481* | (2013.01) |
| *A63F 13/833* | (2014.01) |
| *G07F 17/32* | (2006.01) |
| *G06Q 30/06* | (2012.01) |
| *A63F 13/2145* | (2014.01) |

(52) U.S. Cl.
CPC ........ *G06F 3/0482* (2013.01); *G06F 3/04817* (2013.01); *G06F 16/9535* (2019.01); *G06Q 30/0601* (2013.01); *G07F 17/32* (2013.01); *A63F 13/2145* (2014.09); *A63F 2300/1075* (2013.01); *A63F 2300/8029* (2013.01)

(56) References Cited

FOREIGN PATENT DOCUMENTS

| CN | 102201026 A | 9/2011 |
|---|---|---|
| CN | 104298427 A | 1/2015 |
| CN | 104598518 A | 5/2015 |
| CN | 105183895 A | 12/2015 |
| CN | 105204732 A | 12/2015 |
| CN | 105327509 A | 2/2016 |
| CN | 105447126 A | 3/2016 |
| CN | 105808700 A | 7/2016 |
| CN | 105894350 A | 8/2016 |
| CN | 106512405 A | 3/2017 |
| CN | 106779933 A | 5/2017 |
| EP | 2734275 A1 | 5/2014 |
| WO | WO 2012/159308 A1 | 11/2012 |

OTHER PUBLICATIONS

CN Office Action dated Jul. 27, 2018 in CN application No. 201611110496.3, 5 pages.
CN Office Action dated Apr. 8, 2018 in CN application No. 201611110500.6 with partial English categories, 7 pages.
CN Office Action dated Jul. 5, 2018 in CN application No. 201611110500.6, 7 pages.
CN Office Action dated Sep. 20, 2018 in CN application No. 201611110500.6 with partial English categories, 17 pages.
TW Office Action dated Mar. 11, 2018 in TW application No. 106142803 with partial English categories, 9 pages.
CN PCT Written Opinion dated Feb. 13, 2018 in application No. PCT/CN2017/111182, 4 pages.
International Search Report dated Feb. 13, 2018 in application No. PCT/CN2017/111182 with English translation, 8 pages.
Youxiduo 2015, An Analysis to the props in the preparation system for Arena of Valor, Baidu Wenku https://wenku.baidu.com/view/2e83dbb7f46527d3250ce037?isbtn=1, 4 pages.
Arena of Valor, The gear system of Arena of Valor, Tencent Video, https://v.qq.com/x/page/p0170p[g4si.html, 4 pages.
17173, A full analysis to the props in the preparation system for Arena of Valor, 17173, http://pvp.17173.com/content/04062016/162517572.shtml, 3 Pages.
Merlin, An introduction to the preparation system on how to use the props in a match of Arena of Valor, D.cn, http://ng.d.cn/kingroyal/news/detail_452412_1.html, 3 Pages.

* cited by examiner

FIG. 1-a
FIG. 1-b

FIG. 1-c
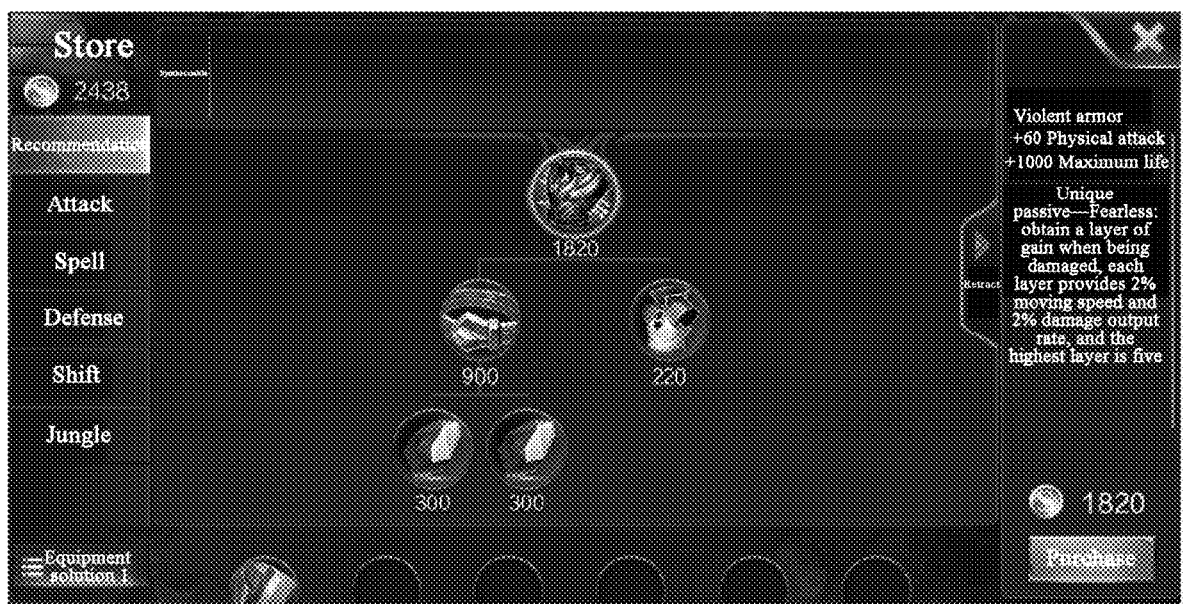
FIG. 1-d

METHOD AND APPARATUS FOR OBTAINING VIRTUAL RESOURCE OF VIRTUAL OBJECT

RELATED APPLICATION

This application is a continuation of International Application No. PCT/CN2017/111182, filed on Nov. 15, 2017, which claims priority to Chinese Patent Application No. 201611110500.6, entitled "METHOD AND APPARATUS FOR OBTAINING PLUG-IN RESOURCE OF VIRTUAL OBJECT" filed on Dec. 6, 2016, and claims priority to Chinese Patent Application No. 201611110496.3, entitled "VIRTUAL PROP RECOMMENDATION METHOD AND CLIENT" filed on Dec. 6, 2016. The entire disclosures of the prior applications are hereby incorporated by reference in their entirety.

FIELD OF THE TECHNOLOGY

The present disclosure relates to the field of Internet technologies, and in particular, to a method and an apparatus for obtaining a virtual resource of a virtual object.

BACKGROUND OF THE DISCLOSURE

In recent years, with the rapid development of Internet technologies, software markets present more applications, which enrich people's lives. To make it convenient for users to use, more applications have a virtual resource (e.g., props, mods, plug-ins, equipment, or subroutines to be used in association with the corresponding application) recommendation function.

Currently, when multiple users use a same category of interactive application online, if the users need to obtain a new virtual resource (e.g., props, mods, plug-ins, equipment, or subroutines), they can obtain the new virtual resource only when a basic application interface of the interactive application or a user state fails, and the users need to open an equipment interface for searching and obtaining a virtual resource. Such an operating manner may interrupt the users in using the interactive application.

To avoid the situation of interrupting the users in using the interactive application during obtaining of the virtual resource, in some examples, a function that the users may obtain the virtual resource at any time in the process of using the interactive application is implemented in the interactive application. When the users need to obtain the virtual resource, they may open the equipment interface on the application interface to execute the operation of obtaining the virtual resource. However, if the users execute multiple operations of obtaining the virtual resource in the process of using the interactive application, they may need to open the equipment interface frequently. This may reduce the smoothness of the interactive application. Therefore, it can be seen that it is inconvenient to obtain plug-in equipment in the current mechanism.

SUMMARY

Embodiments of the present disclosure provide a method and an apparatus for obtaining a virtual resource of a virtual object in order to accurately recommend a suitable virtual resource to a user.

In view of this, an aspect of the embodiments of the present disclosure provides a virtual prop recommendation method. According to one example, circuitry of an apparatus obtains a target object that is in a target application and that is being operated currently, the target application being installed on a user device. The circuitry creates a first prop recommendation list according to the target object, the first prop recommendation list including at least two virtual props, each of the virtual props having a different recommendation priority, and a recommendation priority of each of the virtual props being positively correlated to a matching degree between the respective virtual prop and the target object. If it is determined that a target virtual prop in the first prop recommendation list meets a preset recommendation rule, the circuitry sends the target virtual prop to the user device according to a recommendation priority of the target virtual prop.

Another aspect of the embodiments of the present disclosure provides and apparatus that includes an obtaining module, a creation module, and a sending module. The obtaining module is configured to obtain a target object that is in a target application and that is being operated currently, the target application being installed on a user device. The creation module is configured to create a first prop recommendation list according to the target object, the first prop recommendation list including at least two virtual props, each of the virtual props having a different recommendation priority, and a recommendation priority of each of the virtual props being positively correlated to a matching degree between the respective virtual prop and the target object. The sending module is configured to, if it is determined that a target virtual prop in the first prop recommendation list meets a preset recommendation rule, send the target virtual prop to the user device according to a recommendation priority of the target virtual prop.

Another aspect of the present application provides a non-transitory computer readable storage medium, the non-transitory computer readable storage medium stores instructions, and when being run in a computer, the instructions make the computer execute the method according to the foregoing aspects.

Another aspect of the present application provides a computer program product including instructions, and when being run in a computer, the instructions make the computer execute the method according to the foregoing aspects.

Another aspect of the present application further provides a communications apparatus, the communications apparatus may include an entity such as a terminal device or a chip, the communications apparatus includes: a processor and a memory; the memory is configured to store instructions; and the processor is configured to execute the instructions in the memory, so that the communications apparatus executes the method according to the first aspect or the second aspect.

It can be seen from the foregoing technical solutions that, the embodiments of the present disclosure have the following advantages: because a first prop recommendation list created by a client apparatus is correlated to a currently operated virtual object, it is avoided that a virtual prop that is not suitable for the currently operated virtual object is recommended to a user. In addition, a target virtual prop that meets a preset recommendation rule is filtered out from the first prop recommendation list, to avoid repeated recommendation. Therefore, the present disclosure can accurately recommend a suitable virtual prop to a user.

The present disclosure provides a method and an apparatus for obtaining a plug-in resource of a virtual object, to resolve the problem in the existing technology that plug-in equipment cannot be rapidly obtained on the precondition of ensuring the smoothness of an interactive application.

One aspect provides a method for obtaining a plug-in resource of a virtual object. For example, a processor determines a resource plug-in manner of a virtual object, and determines, according to the determined resource plug-in manner, at least one plug-in resource that meets a plug-in condition. The processor also displays an icon corresponding to the resource plug-in manner and an icon corresponding to the at least one plug-in resource that meets the plug-in condition on an application interface, so that the virtual object obtains the at least one plug-in resource that meets the plug-in condition on the application interface.

Another aspect of the present disclosure provides an apparatus, which has a function for implementing the corresponding method for obtaining a plug-in resource of a virtual object provided in the first aspect. The function may be implemented by using hardware, or may be implemented by executing corresponding software by using hardware. The hardware or software includes one or more modules corresponding to the foregoing function, and the modules may be software and/or hardware. The apparatus includes a processing unit and a display unit. The processing unit is configured to determine a resource plug-in manner of a virtual object, and determine, according to the determined resource plug-in manner, at least one plug-in resource that meets a plug-in condition. The display unit is configured to display an icon corresponding to the resource plug-in manner determined by the processing unit and an icon corresponding to the at least one plug-in resource that meets the plug-in condition on an application interface, so that the virtual object obtains the at least one plug-in resource that meets the plug-in condition on the application interface.

Compared with the existing technology, in the solutions provided in the present disclosure, a resource plug-in manner of a virtual object is determined, and then at least one plug-in resource that meets a plug-in condition is determined according to the determined resource plug-in manner, so that the virtual object does not need to match with a plug-in resource, and the barrier for using an interactive application can be lowered. Then, an icon corresponding to the resource plug-in manner and an icon corresponding to the at least one plug-in resource that meets the plug-in condition are displayed on an application interface, so that the virtual object can directly obtain the plug-in resource that meets the plug-in condition on the application interface, and does not need a complex process of opening another new window to first find a to-be-used plug-in resource, and then enter an obtaining interface. This solution can improve the efficiency of obtaining the plug-in resource.

The embodiments of the present disclosure provide a method for obtaining a virtual resource of a virtual object. For example, circuitry of an apparatus obtains a virtual object that is in a target application and that is being operated currently, the target application being installed on a user device. The circuitry determines a resource assisting manner of the virtual object, and determines, according to the determined resource assisting manner, at least one virtual resource that meets an assisting condition. The circuitry display an icon corresponding to the resource assisting manner and an icon corresponding to the at least one virtual resource that meets the assisting condition on an application interface of the user device, so that the virtual object obtains the at least one virtual resource that meets the assisting condition on the application interface.

The embodiments of the present disclosure include a client, including an obtaining module, a processing unit, and a display unit. The obtaining module is configured to obtain a virtual object that is in a target application and that is being operated currently, the target application being installed on a user device. The processing unit is configured to determine a resource assisting manner of the virtual object. The display unit is configured to display an icon corresponding to the resource assisting manner determined by the processing unit and an icon corresponding to at least one virtual resource that meets an assisting condition on an application interface of the user device, so that the virtual object obtains the at least one virtual resource that meets the assisting condition on the application interface.

Aspects of the disclosure provide a method for obtaining a virtual resource of a virtual object. For example, circuitry of an apparatus identifies the virtual object that is currently operated in a virtual domain accessed by executing a target application, where the target application is installed on a user device. The circuitry determines a resource assisting manner of the virtual object, and determines, according to the determined resource assisting manner, at least one virtual resource that meets an assisting condition, where the virtual object is configured to apply the at least one virtual resource in accordance with the resource assisting manner, and the assisting condition corresponds to a threshold for recommending the at least one virtual resource for the virtual object. The circuitry further displays an icon corresponding to the resource assisting manner and an icon corresponding to the at least one virtual resource that meets the assisting condition on an application interface of the user device, where the at least one virtual resource that meets the assisting condition is obtainable by the virtual object through the application interface.

Aspects of the disclosure provide an apparatus that includes circuitry. The circuitry is configured to identify a virtual object that is currently operated in a virtual domain accessed by executing a target application, where the target application is installed on a user device. The circuitry is configured to determine a resource assisting manner of the virtual object and determine, according to the determined resource assisting manner, at least one virtual resource that meets an assisting condition, where the virtual object is configured to apply the at least one virtual resource in accordance with the resource assisting manner, and the assisting condition corresponds to a threshold for recommending the at least one virtual resource for the virtual object. The circuitry is also configured to cause a display to display an icon corresponding to the resource assisting manner and an icon corresponding to the at least one virtual resource that meets an assisting condition on an application interface of the user device, where the at least one virtual resource that meets the assisting condition is obtainable by the virtual object through the application interface.

Aspects of the disclosure provide a non-transitory computer-readable storage medium storing computer-readable instructions, which when executed by a processor, cause the processor to perform at least the following operations. For example, a virtual object that is currently operated in a virtual domain accessed by executing a target application is identified, where the target application is installed on a user device. A resource assisting manner of the virtual object is determined, and at least one virtual resource that meets an assisting condition is determined according to the determined resource assisting manner, where the virtual object is configured to apply the at least one virtual resource in accordance with the resource assisting manner, and the assisting condition corresponds to a threshold for recommending the at least one virtual resource for the virtual object. An icon corresponding to the resource assisting manner and an icon corresponding to the at least one virtual resource that meets the assisting condition are displayed on an application interface of the user device, where the at least one virtual resource that meets the assisting condition is obtainable by the virtual object through the application interface.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following descriptions show only some embodiments of the present disclosure, and a person of ordinary skill in the art may still derive other drawings from these accompanying drawings.

FIG. 1-*a* is a schematic diagram of a recommendation interface of a virtual prop according to the embodiments of the present disclosure;

FIG. 1-*b* is a schematic diagram of viewing detailed information of a virtual prop recommended by a client according to the embodiments of the present disclosure;

FIG. 1-*c* is a schematic diagram of multiple prop recommendation lists provided by a client according to the embodiments of the present disclosure;

FIG. 1-*d* is a schematic diagram of synthesis of virtual props according to the embodiments of the present disclosure;

DESCRIPTION OF EMBODIMENTS

Figure 2:
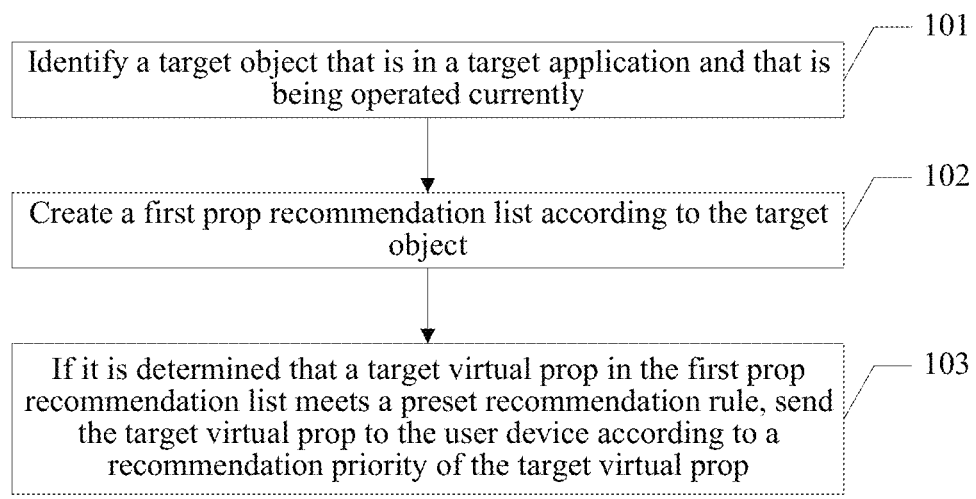
FIG. 2 is a schematic diagram of an embodiment of a virtual prop recommendation method according to an embodiment of the present disclosure.

The embodiments of the present disclosure provide a virtual resource recommendation method and a client, to accurately recommend a suitable virtual resource to a user. A virtual prop or a plug-in resource for an object operated in a virtual domain accessed by executing an interactive application is described in various embodiments of this disclosure, and the terminology of "prop," "plug-in resource," and "resource" may be used interchangeably in this disclosure for the purposes of describing various examples. However, other types of virtual resources or variations thereof are within the scope of the present disclosure.

The terms "first", "second", "third", "fourth", and the like (if exists) in the specification and the claims of the present disclosure and the foregoing accompanying drawings are used for distinguishing various objects, and do not need to be used for describing a particular sequence or order. It should be understood that data used in this way is interchangeable in a suitable case, so that the embodiments of the present disclosure described herein can be implemented in a sequence in addition to the sequence shown or described herein. In addition, the terms "include", "comprise", and any variants thereof are intended to cover a non-exclusive inclusion. For example, a process, method, system, product, or device that includes a series of steps or elements is not limited to the steps or units that are clearly listed, but may include other steps or units that are not clearly listed or that are inherent to the process, method, product, or device.

It should be understood that, solutions described in the present disclosure may be applied to virtual resource obtaining and virtual resource recommendation in a virtual scenario. First, a method for obtaining a virtual resource of a virtual object provided in an embodiment of the present disclosure is described, and the method mainly includes obtaining (e.g., identifying or obtaining the identification of) a virtual object that is currently operated in a virtual domain accessed by executing a target application (or simply being referred to as "in the target application"), the target application being installed on a user device; determining a resource assisting manner of the virtual object; determining, according to the determined resource assisting manner, at least one virtual resource that meets an assisting condition; and displaying an icon corresponding to the resource assisting manner and an icon corresponding to the at least one virtual resource that meets the assisting condition on an application interface of the user device, the at least one virtual resource that meets the assisting condition being obtainable by the virtual object through the application interface.

The virtual object may also be defined as a target object. A terminal device in the present disclosure is installed with an interactive application (or referred to as a client or a client end). The interactive application includes an application interface. The virtual object refers to a virtual role that runs within a virtual domain accessed by executing the interactive application, such as a hero role in a game. The resource assisting manner corresponds to information of virtual resources to be recommended to the virtual object during a process of using the interactive application, and a sequence of recommending the virtual resources. The resource assisting manner may be used to provide an assisting or enhanced resource implementation manner to the virtual object. For example, the resource assisting manner may be a resource plug-in manner, and the virtual resource may be a plug-in resource, for example, refer to a resource that is designed in the interactive application and that can have assisting and enhancing functions for operations of the virtual object when the virtual object uses the interactive application. For example, in a game, the plug-in resource may be certain equipment, and the equipment can improve a capability parameter of a hero. Plug-in refers to additional tools and instruments that are used to assist the virtual object and that are added to an original virtual object by the virtual object by controlling a system.

In some embodiments of the present disclosure, after the obtaining a virtual object that is in a target application and that is being operated currently, the method further includes: creating a first resource recommendation list according to the virtual object, the first resource recommendation list including at least two virtual resources, each of the virtual resources having a different recommendation priority, and a recommendation priority of each of the virtual resources being positively correlated to a matching degree between the virtual resource and the virtual object; and if it is determined that a target virtual resource in the first resource recommendation list meets a preset recommendation rule, sending the target virtual resource to the user device according to a recommendation priority of the target virtual resource.

The resource recommendation list may be used to recommend a virtual resource to a virtual object, for example, may recommend a prop.

In some embodiments of the present disclosure, before the sending the target virtual resource to the user device according to a recommendation priority of the target virtual resource, the method further includes: determining whether the target virtual resource in the first resource recommendation list matches a virtual resource database of the virtual object; and if the target virtual resource does not match the virtual resource database, determining that the target virtual resource in the first resource recommendation list meets the preset recommendation rule.

In some embodiments of the present disclosure, the determining whether the target virtual resource in the first resource recommendation list matches a virtual resource database of the virtual object includes: determining whether the target virtual resource exists in the virtual resource database of the virtual object, and if the target virtual resource does not exist in the virtual resource database, determining that the target virtual resource in the first resource recommendation list does not match the virtual resource database of the virtual object; or determining whether a virtual resource matching an attribute of the target virtual resource exists in the virtual resource database of the virtual object, and if the target virtual resource does not exist in the virtual resource database, determining that the target virtual resource in the first resource recommendation list does not match the virtual resource database of the virtual object.

In some embodiments of the present disclosure, if the target virtual resource includes a first virtual resource and a second virtual resource, the sending the target virtual resource to the user device according to a recommendation priority of the target virtual resource includes: sending the first virtual resource to the user device if it is determined that a recommendation priority of the first virtual resource is greater than a recommendation priority of the second virtual resource; and sending the second virtual resource to the user device after it is determined that the first virtual resource is added to the virtual resource database of the virtual object.

In some embodiments of the present disclosure, before the sending the second virtual resource to the user device, the method further includes: determining whether available resources in the virtual resource database of the virtual object are not less than resources required by the second virtual resource, and if the available resources are not less than the resources required by the second virtual resource, executing the operation of sending the second virtual resource to the user device.

In some embodiments of the present disclosure, the method further includes: sending a precursory virtual resource of the second virtual resource to the user device if the remaining resource in the virtual resource database of the virtual object are less than the resources required by the second virtual resource, the precursory virtual resource being used to synthesize the second virtual resource.

In some embodiments of the present disclosure, the method further includes: receiving a resource recommendation list switching request; determining a second resource recommendation list according to the resource recommendation list switching request; and switching the first resource recommendation list to the second resource recommendation list.

In some embodiments of the present disclosure, the resource assisting manner corresponds to information of virtual resources and an obtaining sequence of the virtual resources; and the assisting condition includes: reaching the obtaining sequence of the virtual resources, having sufficient account balances of the virtual object, and being in a different type and a different level from the existing virtual resources of the virtual object.

In some embodiments of the present disclosure, after the displaying an icon corresponding to the resource assisting manner and an icon corresponding to the at least one virtual resource that meets the assisting condition on an application interface of the user device, the method further includes: traversing the selected resource assisting manner when the current existing virtual resource of the virtual object changes; and when determining that there exists a target virtual resource that reaches the obtaining sequence of the virtual resources, has sufficient account balances of the virtual object, and is in a different type from the existing virtual resources of the virtual object, adding the target virtual resource to a resource queue, and updating the resource queue.

In some embodiments of the present disclosure, after the displaying an icon corresponding to the resource assisting manner and an icon corresponding to the at least one virtual resource that meets the assisting condition on an application interface of the user device, the method further includes: receiving an operation instruction of the virtual object, the operation instruction being an instruction sent by the virtual object when it is determined, according to battle situation information of the virtual object, that the currently selected resource assisting manner is not suitable for the current battle situation; and updating the resource assisting manner of the virtual object in response to the operation instruction.

In some embodiments of the present disclosure, the method further includes: sending interactive data of the virtual object to a server, so that the server calculates, according to the interactive data and interactive data sent by other terminals, comprehensive parameter values corresponding to resource assisting manners, sorts priorities of the resource assisting manners according to the comprehensive parameter values of the resource assisting manners, and sends resource assisting manners whose comprehensive parameter values are higher than a preset threshold to the user device.

The interactive data includes the used virtual object, the number of wins corresponding to the resource assisting manners, win rates corresponding to the resource assisting manner, and virtual resources obtained by the virtual object.

It should be understood that, the solutions of the present disclosure may be applied to competitive services, and may be applied to an application, e.g., application A in an entertainment hall. It may be understood that, the solutions of the present disclosure are not only limited to be applied the application, for example, may be further applied to other application scenarios in which virtual props are needed. However, for ease of description, being applied to the application A is used as an example for description.

The application A is a multiplayer competition game, and a main interface in the game provides an entry for rapidly purchasing recommended equipment (for example, a virtual prop). As shown in FIG. 1-a, FIG. 1-a is a schematic diagram of a recommendation interface of a virtual prop according to the embodiments of the present disclosure. The client calculates two pieces of equipment with the highest recommendation priority according to a recommendation algorithm, and displays the two pieces of equipment with the highest recommendation priority at the upper left corner of a main battle interface. While displaying recommended equipment, the client displays both the brief description and the price of the recommended equipment. To avoid interfering with the operation, the brief description of the recommended equipment may disappear after several seconds. A player may purchase the recommended equipment by clicking the icon of the recommended equipment. Meanwhile, as shown in FIG. 1-b, FIG. 1-b is a schematic diagram of viewing detailed information of a virtual prop recommended by a client according to the embodiments of the present disclosure. A player may view detailed information of recommended equipment in a store. In addition, as shown in FIG. 1-c, FIG. 1-c is a schematic diagram of multiple prop recommendation lists provided by a client according to the embodiments of the present disclosure. A player may switch a prop recommendation list according to a battle situation, and the client performs a corresponding equipment recommendation operation according to the switched prop recommendation list.

In addition, the equipment recommended by the client may be obtained by synthesizing other precursory equipment. As shown in FIG. 1-d, FIG. 1-d is a schematic diagram of synthesis of virtual props according to the embodiments of the present disclosure. If money of a player is not enough to purchase the recommended equipment, the client may recommend precursory equipment of the recommended equipment to the player.

For ease of understanding, the following describes the virtual prop recommendation method in the present disclosure by using specific embodiments.

Referring to FIG. 2, an embodiment of the virtual prop recommendation method in the present disclosure may include the following steps. The steps may be performed according to a logical relationship, or the steps may be performed by combination according to a specific scenario, which is not limited herein.

101. Identify (or obtain identification of) a target object that is in a target application and that is being operated currently (i.e., that is currently operated in a virtual domain accessed by executing the target application).

In this embodiment, the target application is installed on a user device, and the target object may be the foregoing virtual object. In actual application, for example, the target application may be a game application, and the target object may be a game role in the game application. A virtual object is set in the target application, and the virtual object refers to a virtual role that runs the target application, for example, a hero role in a game.

102. Create a first prop recommendation list according to the target object.

In this embodiment, that a first resource recommendation list is created as an example. The first prop recommendation list includes at least two virtual props, each of the virtual props has a different recommendation priority, and a recommendation priority of each of the virtual props is positively correlated to a matching degree between the virtual prop and the target object.

In one example, the target application is a game application. The target object is a wizard in the game application, and the first prop recommendation list includes two virtual props, a virtual prop 1 and a virtual prop 2. The virtual prop 1 may be used to increase spell power of a game role, and the virtual prop 2 may be used to increase physical attacks of the game role. The game role is used as an example. Because the game role is a wizard, benefits brought by increased spell power for the wizard are higher than benefits brought by increased physical attacks, a matching degree between the virtual prop 1 and the wizard is higher than a matching degree between the virtual prop 2 and the wizard, so that a recommendation priority of the virtual prop 1 is higher than a recommendation priority of the virtual prop 2.

103. If it is determined that a target virtual prop in the first prop recommendation list meets a preset recommendation rule, send the target virtual prop to the user device according to a recommendation priority of the target virtual prop.

In this embodiment, the foregoing target virtual resource may be specifically a target virtual prop. After the client creates the first prop recommendation list, because some virtual props that do not meet the preset recommendation rule exist in the first prop recommendation list, the client needs to filter out target virtual props that meet the preset recommendation rule, and then may send the target virtual props to the user device according to recommendation priorities of the target virtual props.

For example, assuming that the target virtual props that meet the preset recommendation rule are a first virtual prop, a second virtual prop, and a third virtual prop, if a recommendation priority of the first virtual prop is higher than a recommendation priority of the second virtual prop, and the recommendation priority of the second virtual prop is higher than a recommendation priority of the third virtual prop, the client may preferentially send the first virtual prop to the user device, then send the second virtual prop to the user device, and finally send the third virtual prop to the user device. In some embodiments, the client may also send both the first virtual prop and the second virtual prop to the user device, and then send the third virtual prop to the user device.

It may be understood that, the reason why the client in this embodiment needs to filter out the target virtual props that meet the preset recommendation rule may include at least one of the following cases: 1. An existing virtual prop of the target object exists in the first prop recommendation list, and the client needs to filter out the existing virtual prop of the target object, to avoid recommending the duplicated virtual prop to a user; and 2. A virtual prop matching an attribute of the existing virtual prop of the target object exists in the first prop recommendation list, and the client filters out the virtual prop matching the attribute of the existing virtual prop of the target object, to avoid recommending the virtual prop matching the attribute of the existing virtual prop of the target object to a user.

In one embodiment, because a first prop recommendation list created by a client is correlated to a currently operated virtual object, it is avoided that a virtual prop that is not suitable for the currently operated virtual object is recommended to a user. In addition, a target virtual prop that meets a preset recommendation rule is filtered out from the first prop recommendation list, to avoid repeated recommendation. Therefore, the present disclosure can accurately recommend a suitable virtual prop to a user.

In another embodiment of the present disclosure, before the sending the target virtual prop to the user device according to a recommendation priority of the target virtual prop, the method provided in this embodiment of the present disclosure may further include: determining whether the target virtual prop in the first prop recommendation list matches a virtual resource database (e.g., a virtual prop database) of the target object; and if the target virtual prop in the first prop recommendation list does not match the virtual resource database of the target object, determining that the target virtual prop in the first prop recommendation list meets the preset recommendation rule.

In one embodiment, the virtual resource database may include a virtual prop database, and the target virtual prop in the first prop recommendation list may match one or several virtual props in the virtual prop database of the target object. The virtual prop database stores the existing virtual prop of the target object. The effect of the preset recommendation rule is filtering out a virtual prop not matching the existing virtual prop of the target object, namely, a target virtual prop, from the first prop recommendation list, to avoid recommending a virtual prop matching the existing virtual prop of the target object to a user.

Further, in some embodiments of the present disclosure, at least two methods are available for determining whether the target virtual prop matches the virtual prop database of the target object. Specifically, the determining whether the target virtual prop in the first prop recommendation list matches the virtual prop database of the target object may include: determining whether a target virtual prop exists in the virtual prop database of the target object, and if the target virtual prop does not exist in the virtual prop database of the target object, determining that the target virtual prop in the first prop recommendation list does not match the virtual prop database of the target object; or determining whether a virtual prop matching an attribute of the target virtual prop exists in the virtual prop database of the target object, and if the virtual prop matching the attribute does not exist in the virtual prop database of the target object, determining that the target virtual prop in the first prop recommendation list does not match the virtual prop database of the target object.

In one embodiment, if a user has purchased the target virtual prop for the target object, the virtual prop database of the target object has stored the target virtual prop, so that the target virtual prop matches the virtual prop database. If a user has not purchased the target virtual prop for the target object, the virtual prop database of the target object has not stored the target virtual prop, so that the target virtual prop does not match the virtual prop database.

Likewise, if a user has purchased the virtual prop matching the attribute of the target virtual prop of the target object, the virtual prop database of the target object has stored the virtual prop matching the attribute of the target virtual prop, so that the target virtual prop matches the virtual prop database. If a user has not purchased the virtual prop matching the attribute of the target virtual prop of the target object, the virtual prop database of the target object has not stored the virtual prop matching the attribute of the target virtual prop, so that the target virtual prop does not match the virtual prop database.

It should be noted that, that the virtual prop matching the attribute of the target virtual prop exists in the virtual prop database of the target object may include at least one of the following cases: one or several virtual props in the virtual prop database of the target object have a same function, effect, level, category, or the like as the target virtual prop, and the function, effect, level, category, and the like are unique. Descriptions are provided below by using an example. Assuming that the effect of the virtual prop matching the attribute of the target virtual prop is 20% increase of the moving speed of the target object, the effect of superposing the target virtual prop and the virtual prop is still 20% increase of the moving speed of the target object.

In some embodiments of the present disclosure, the method may further include: receiving a prop recommendation list switching request; determining a second prop recommendation list according to the prop recommendation list switching request; and replacing the first prop recommendation list with a second prop recommendation list.

In one embodiment, the resource recommendation list switching request may be specifically a prop recommendation list switching request. The client may provide multiple prop recommendation lists, and when a user is unsatisfied with the current prop recommendation list, the user may select another prop recommendation list, and the client in the embodiments of the present disclosure seamlessly switches to a new prop recommendation list. If the target application is a game application, when the client provides multiple prop recommendation lists, the client may preferentially recommend a prop recommendation list with the highest win rate to a user according to historical win rates of the user in using the prop recommendation list.

To help understand the technical solutions of the present disclosure, the target virtual prop is divided into a first virtual prop and a second virtual prop in the following embodiments.

Figure 3:
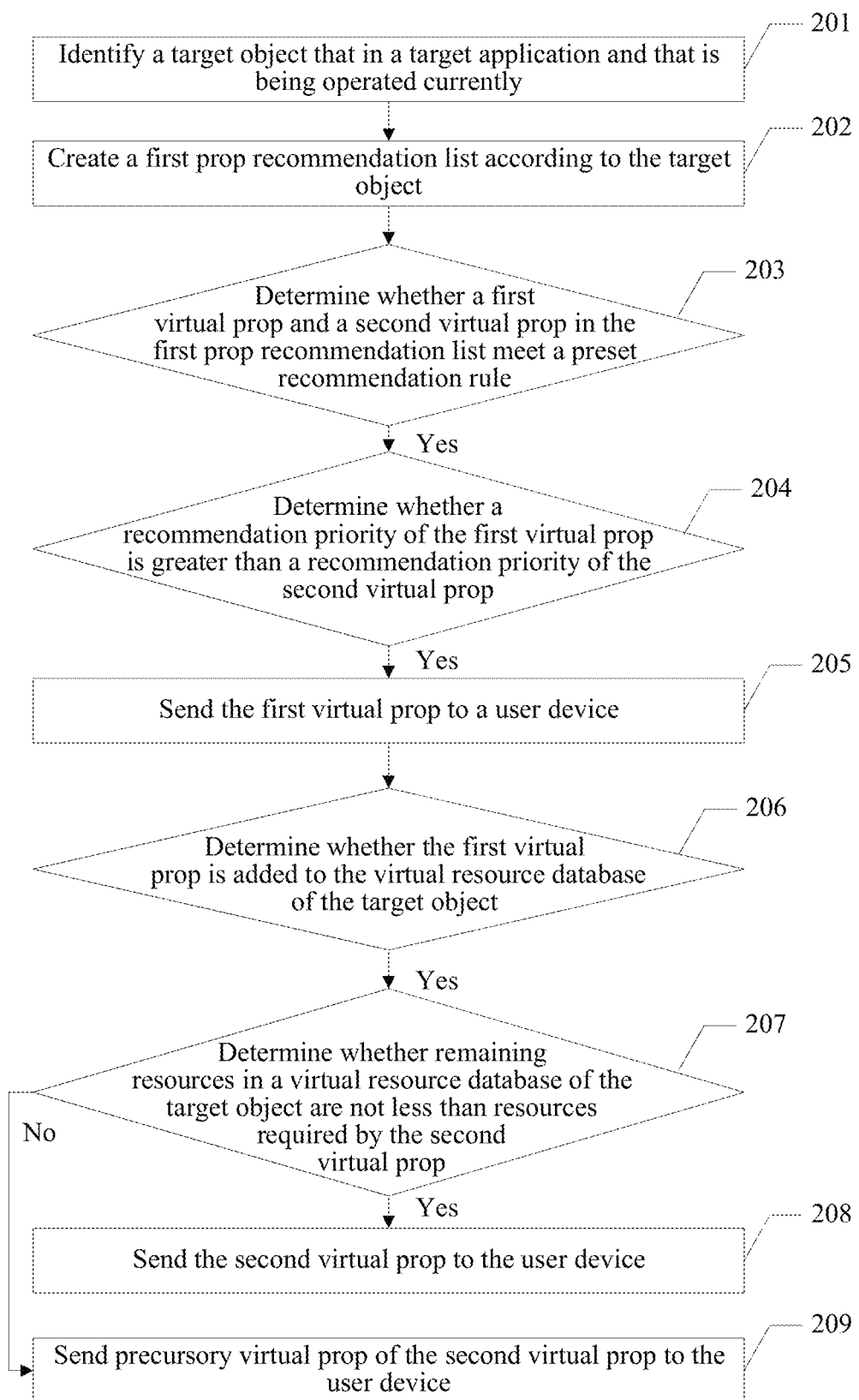
FIG. 3 is a schematic diagram of another embodiment of a virtual prop recommendation method according to an embodiment of the present disclosure.

Specifically, referring to FIG. 3, another embodiment of the virtual prop recommendation method in the embodiments of the present disclosure includes:

201. Identify a target object that in a target application and that is being operated currently (i.e., that is currently operated in a virtual domain accessed by executing the target application).

202. Create a first prop recommendation list according to the target object.

In one embodiment, step 201 and step 202 are similar to the foregoing step 101 and step 102. For descriptions, refer to the examples in the foregoing embodiments, and details are not described herein again.

203. Determine whether a first virtual prop and a second virtual prop in the first prop recommendation list meet a preset recommendation rule, and if the first virtual prop and the second virtual prop in the first prop recommendation list meet the preset recommendation rule, perform step 204.

In one embodiment, the client may determine whether the first virtual prop matches a virtual resource database (e.g. a virtual prop database) of the target object, and if the first virtual prop does not match the virtual prop database of the target object, determine that the first virtual prop meets the preset recommendation rule. Likewise, the client may determine whether the second virtual prop matches the virtual prop database of the target object, and if the second virtual prop does not match the virtual prop database of the target object, determine that the second virtual prop meets the preset recommendation rule.

204. Determine whether a recommendation priority of the first virtual prop is greater than a recommendation priority of the second virtual prop, and if the recommendation priority of the first virtual prop is greater than the recommendation priority of the second virtual prop, perform step 205.

205. Send the first virtual prop to a user device.

In one embodiment, if the recommendation priority of the first virtual prop is greater than the recommendation priority of the second virtual prop, the first virtual prop is preferentially sent to the user device.

It may be understood that, if the recommendation priority of the second virtual prop is greater than the recommendation priority of the first virtual prop, the second virtual prop is preferentially sent to the user device.

206. Determine whether the first virtual prop is added to the virtual resource database (e.g. the virtual prop database) of the target object, and if the first virtual prop is added to the virtual prop database of the target object, perform step 207.

In one embodiment, in a case where available resources of the virtual resource database (e.g. the virtual prop database) of the target object before adding the first virtual prop to the virtual resource database is less than resources required by the first virtual prop, the first virtual prop cannot be added to the virtual prop database of the target object. Therefore, the client needs to first determine whether the currently available resources of the virtual resource database of the target object are not less than the resources required by the first virtual prop, and if the currently available resources of the virtual resource database of the target object are not less than the resources required by the first virtual prop, the client can add the first virtual prop to the virtual prop database of the target object, and then perform step 207, otherwise, the client cannot add the first virtual prop to the virtual prop database of the target object.

207. Determine whether available resources in the virtual resource database of the target object are not less than resources required by the second virtual prop, and if the available resources in the virtual resource database of the target object are not less than the resources required by the second virtual prop, perform step 208, otherwise, perform step 209.

In one embodiment, because some resources in the virtual resource database may be used in the process of adding the first virtual prop to the virtual prop database of the target object, available resources in the virtual resource database may be less than the resources required by the second virtual prop, so that the second virtual prop cannot be added to the virtual prop database of the target object, and it may be unnecessary to send the second virtual prop to the user device. Therefore, the client first determines whether the available resources in the virtual resource database of the target object are not less than the resources required by the second virtual prop, and if the available resources in the virtual resource database of the target object are not less than the resources required by the second virtual prop, step 208 is performed, otherwise, step 209 is performed.

208. Send the second virtual prop to the user device.

In one embodiment, after it is determined that the available resources in the virtual resource database of the target object are not less than the resources required by the second virtual prop, the second virtual prop is sent to the user device.

209. Send precursory virtual prop of the second virtual prop to the user device.

In this embodiment, after it is determined that the available resources in the virtual resource database of the target object are less than the resources required by the second virtual prop, the client may send the precursory virtual prop of the second virtual prop to the user device, where the second virtual prop may include one or at least two precursory virtual props, and the precursory virtual prop may be usable to synthesize the second virtual prop.

It may be understood that, before the client sends the precursory virtual prop of the second virtual prop to the user device, the client may further determine whether available resources in the virtual resource database of the target object are not less than resources required by the precursory virtual prop, and if the available resources in the virtual resource database of the target object are not less than the resources required by the precursory virtual prop, send the precursory virtual prop of the second virtual prop to the user device. Alternatively, before the client sends the precursory virtual prop of the second virtual prop to the user device, the client may further determine whether the precursory virtual prop matches the virtual prop database of the target object, and if the precursory virtual prop does not match the virtual prop database of the target object, send the precursory virtual prop of the second virtual prop to the user device.

Figure 4:
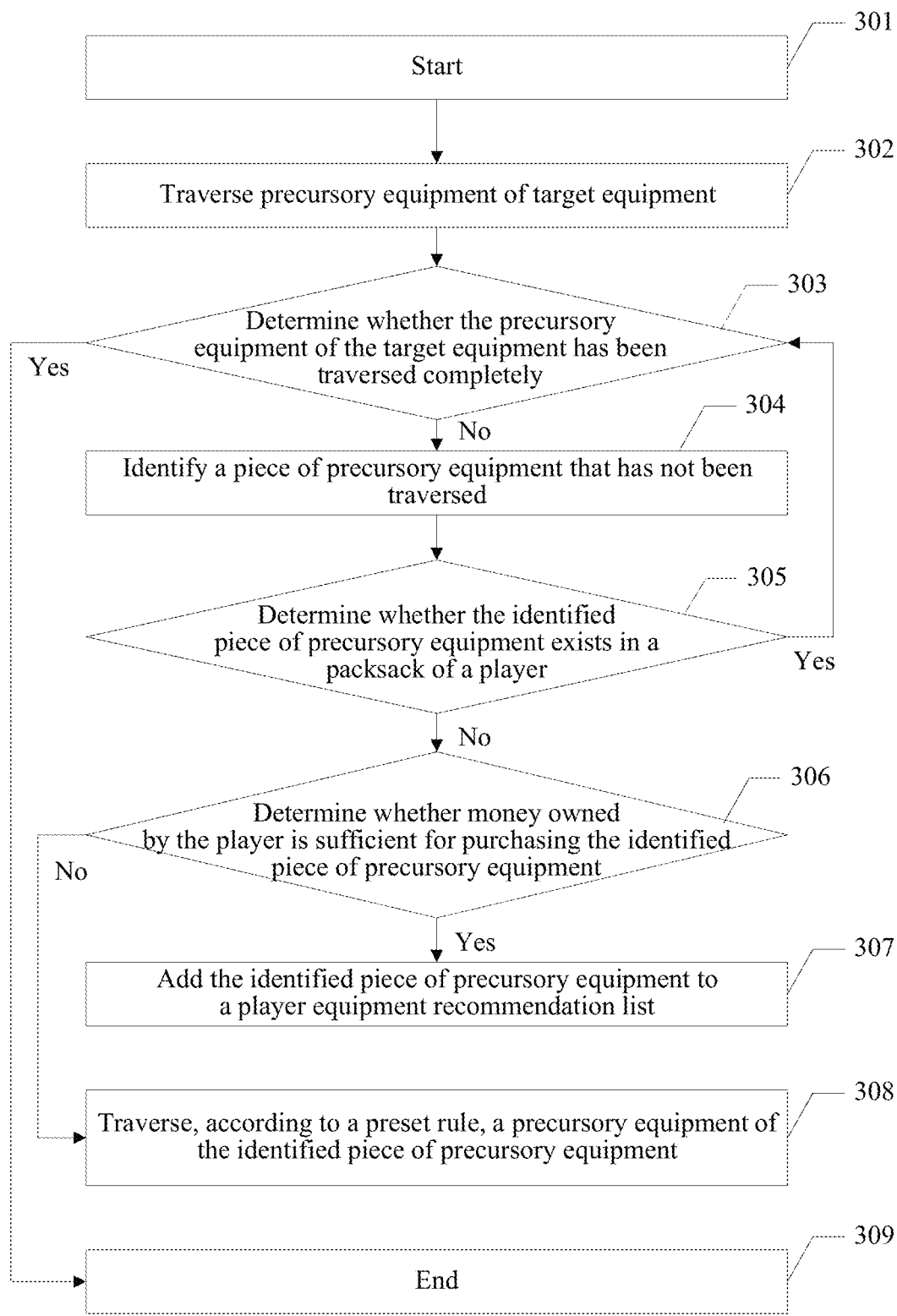
FIG. 4 is a flowchart of a recommendation method of a precursory virtual prop according to an embodiment of the present disclosure.

As shown in FIG. 4, FIG. 4 is a flowchart of a recommendation method of a precursory virtual prop according to an embodiment of the present disclosure. An application A is used as an example in FIG. 4. The application A is a multiplayer competitive game. The precursory virtual prop is represented by precursory equipment in FIG. 4. The precursory equipment is used to synthesize target equipment. The recommendation method of the precursory virtual prop provided in FIG. 4 includes the following steps:

Step 301. Start.

Step 302. Traverse precursory equipment of target equipment.

Step 303. Determine whether the precursory equipment of the target equipment has been traversed completely, and if the precursory equipment of the target equipment has been traversed completely, perform step 309, otherwise, perform step 304.

Step 304. Identify a piece of precursory equipment that has not been traversed.

Step 305. Determine whether the identified piece of precursory equipment exists in a packsack of a player, and if the identified piece of precursory equipment exists in the packsack of the player, go back to perform step 303, otherwise, perform step 306.

Step 306. Determine whether money owned by the player is sufficient for purchasing the identified piece of precursory equipment, and if the money owned by the player is sufficient for purchasing the identified piece of precursory equipment, perform step 307, otherwise, perform step 308.

Step 307. Add the identified piece of precursory equipment to a player equipment recommendation list, and then go back to perform step 303.

Step 308. Traverse, according to a preset rule, a precursory equipment (i.e., a child precursory equipment) of the identified piece of precursory equipment.

It should be noted that, the preset rule may be a rule similar to the foregoing step 303 to step 307. For example: the preset rule is determining whether the child precursory equipment of the identified precursory equipment is traversed completely, if the child precursory equipment is traversed completely, identify one piece of child precursory equipment that has not been traversed, and determining whether the identified child precursory equipment exists in the packsack of the player; and if the identified child precursory equipment does not exist in the packsack of the player, further determining whether money owned by the player is sufficient for purchasing the child precursory equipment; and if the money owned by the player is sufficient for purchasing the child precursory equipment, adding the child precursory equipment to the player equipment recommendation list.

Step 309. End.

Further, the following embodiments are used for description. Assuming that the virtual resource database of the target object has 2000 gold coins, and gold coins required by the second virtual prop are 3000, because the gold coins in the virtual resource database are not enough to purchase the second virtual prop, the client does not send the second virtual prop to the user device. In this case, if the client determines that the second virtual prop may be obtained by synthesizing one precursory virtual prop 1, one precursory virtual prop 2, and one precursory virtual prop 3, where gold coins required by the precursory virtual prop 1 are 1800, gold coins required by the precursory virtual prop 2 are 700, and gold coins required by the precursory virtual prop 3 are 500. In this example, because the gold coins required by the precursory virtual prop 1 are nearest to the gold coins in the virtual resource database, and the gold coins required by the precursory virtual prop 1 are less than the gold coins in the virtual resource database, the client preferentially sends the precursory virtual prop 1 to the user device.

In one embodiment, because a first prop recommendation list created by a client is correlated to a currently operated virtual object, it is avoided that a virtual prop that is not suitable for the currently operated virtual object is recommended to a user. In addition, a first virtual prop and a second virtual prop that meet a preset recommendation rule are filtered out from the first prop recommendation list, to avoid repeated recommendation. Therefore, the present disclosure can accurately recommend a suitable virtual prop to a user.

Also, in one embodiment, an actual situation whether the available resources in the virtual resource database meet the resources required by the second virtual prop is considered. The client sends the second virtual prop to the user device only on the condition that the available resources in the virtual resource database meet the resources required by the second virtual prop, to avoid the problem that the second virtual prop cannot be added to the virtual prop database of the target object. Moreover, if the available resources in the virtual resource database do not meet the resources required by the second virtual prop, the client may further select to send the precursory virtual prop of the second virtual prop to the user device, thereby completing the technical solutions of the present disclosure.

The following describes the virtual prop recommendation method in the embodiments of the present disclosure by using a specific application scenario.

A particular player opens an application B, a role of the particular player in the application B is a warrior W, and after a period of game time, the particular player accumulates 3000 gold coins for the warrior W. The client creates a prop recommendation list according to a character attribute of the warrior W, and the prop recommendation list includes multiple pieces of equipment with different recommendation priorities. After the client determines that equipment 1 with the highest priority in the prop recommendation list has not been purchased by the particular player, and there is no other equipment in a packsack of the warrior W having an effect overlapping the effect of the equipment 1, if the client further determines that 3000 gold coins are enough to purchase the equipment 1, the client displays the equipment 1 on the upper left corner of the game interface. Moreover, when the equipment 1 is being displayed, both the brief description and the price of the equipment 1 are displayed. After a predetermined period, such as five seconds, the brief description of the equipment 1 disappears, and the particular player may purchase the equipment 1 by clicking the icon of the equipment 1. If the client determines that 3000 gold coins are not enough to purchase the equipment 1, the client determines multiple pieces of precursory equipment of the equipment 1 with various recommendation priorities. After the client determines that precursory equipment 1*a* with the highest priority in the multiple pieces of precursory equipment of the equipment 1 has not been purchased by a player, and there is no other equipment in a packsack of the warrior W having an effect overlapping the effect of the precursory equipment 1*a*, if the client further determines that 3000 gold coins are enough to purchase the precursory equipment 1*a*, the client displays the precursory equipment 1*a* on the upper left corner of the game interface. Moreover, when the precursory equipment 1*a* is being displayed, both the brief description and the price of the precursory equipment 1*a* are displayed. After a predetermined period, such as five seconds, the brief description of the precursory equipment 1*a* disappears, and the particular player may purchase the precursory equipment 1*a* by clicking the icon of the precursory equipment 1*a*.

Figure 5:
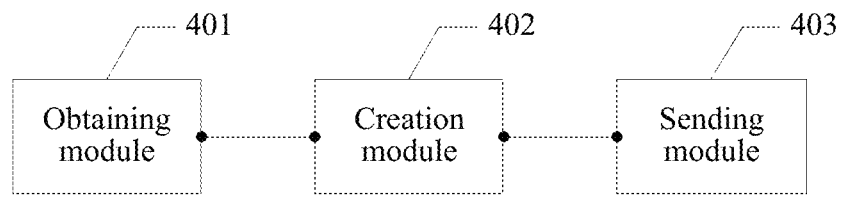
FIG. 5 is a schematic diagram of an embodiment of a client according to an embodiment of the present disclosure.

The foregoing describes the virtual prop recommendation method of the present disclosure by using specific embodiments. The following describes the client in the present disclosure by using various embodiments. Referring to FIG. 5, the client in this embodiment of the present disclosure includes: an obtaining module 401, configured to identify a target object that is in a target application and that is being operated currently, the target application being installed on a user device; a creation module 402, configured to create a first prop recommendation list according to the target object, the first prop recommendation list including at least two virtual props, each of the virtual props having a different recommendation priority, and a recommendation priority of each of the virtual props being positively correlated to a matching degree between the virtual prop and the target object; and a sending module 403, configured to: if it is determined that a target virtual prop in the first prop recommendation list meets a preset recommendation rule, send the target virtual prop to the user device according to a recommendation priority of the target virtual prop.

In one embodiment, because a first prop recommendation list created by a client is correlated to a currently operated virtual object, it is avoided that a virtual prop that is not suitable for the currently operated virtual object is recommended to a user; and in addition, a target virtual prop that meets a preset recommendation rule is filtered out from the first prop recommendation list, to avoid repeated recommendation. Therefore, the present disclosure can accurately recommend a suitable virtual prop to a user.

Figure 6:
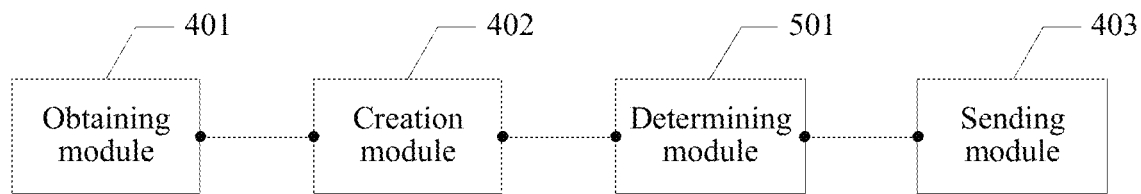
FIG. 6 is a schematic diagram of another embodiment of a client according to an embodiment of the present disclosure.

Optionally, as shown in FIG. 6, in an optional embodiment of the present disclosure, the client further includes: a determining module 501, configured to, before the sending module 403 sends the target virtual prop to the user device according to the recommendation priority of the target virtual prop, determine whether the target virtual prop in the first prop recommendation list matches a virtual prop database of the target object, where the virtual prop database stores the existing virtual prop of the target object; and if the target virtual prop does not match the virtual prop database, determine that the target virtual prop in the first prop recommendation list meets the preset recommendation rule.

In one embodiment, whether the target virtual prop in the first prop recommendation list meets the preset recommendation rule is determined by determining whether the target virtual prop in the first prop recommendation list matches the virtual prop database of the target object, thereby completing the technical solutions of the present disclosure.

Further, in another embodiment of the present disclosure, the determining module 501 is configured to determine whether the target virtual prop exists in the virtual prop database of the target object, and if the target virtual prop does not exist in the virtual prop database, determine that the target virtual prop in the first prop recommendation list does not match the virtual prop database of the target object; or determine whether a virtual prop matching an attribute of the target virtual prop exists in the virtual prop database of the target object, and if the target virtual prop does not exist in the virtual prop database, determine that the target virtual prop in the first prop recommendation list does not match the virtual prop database of the target object.

In some embodiments, determining whether the target virtual prop matches the virtual prop database is implemented using one or more of at least two example methods as described above.

In another embodiment of the present disclosure, if the target virtual prop includes a first virtual prop and a second virtual prop, the sending module 403 is configured to send the first virtual prop to the user device if it is determined that a recommendation priority of the first virtual prop is greater than a recommendation priority of the second virtual prop; and send the second virtual prop to the user device after it is determined that the first virtual prop is added to the virtual prop database of the target object.

Further, the determining module 501 is further configured to: before the sending module 403 sends the second virtual prop to the user device, determine whether available resources in the virtual resource database of the target object are not less than resources required by the second virtual prop, and if the available resources are not less than the resources required by the second virtual prop, execute the operation of sending the second virtual prop to the user device.

Further, the sending module 403 is further configured to send a precursory virtual prop of the second virtual prop to the user device if the available resources in the virtual resource database of the target object are less than the resources required by the second virtual prop, the precursory virtual prop being usable to synthesize the second virtual prop.

In this embodiment, an actual situation whether the available resources in the virtual prop database meet the resources required by the second virtual prop is considered. The client sends the second virtual prop to the user device only on the condition that the available resources in the virtual resource database meet the resources required by the second virtual prop, to avoid the problem that the second virtual prop cannot be added to the virtual prop database of the target object. Moreover, if the available resources in the virtual resource database do not meet the resources required by the second virtual prop, the client may further select to send the precursory virtual prop of the second virtual prop to the user device.

Figure 7:
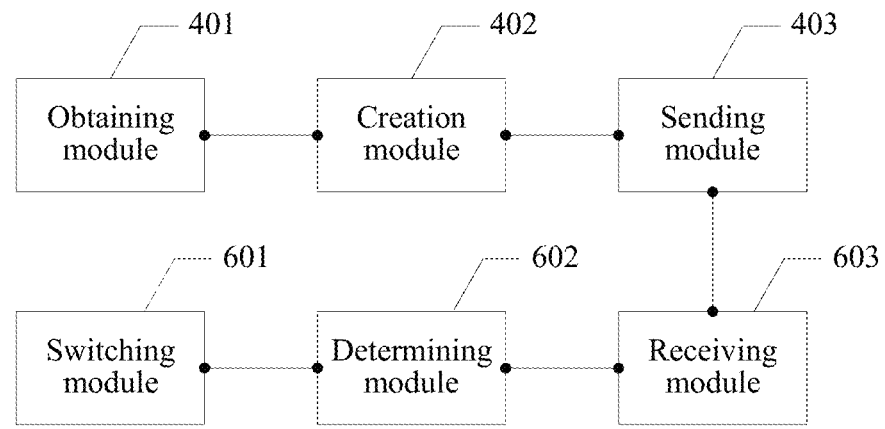
FIG. 7 is a schematic diagram of another embodiment of a client according to an embodiment of the present disclosure.

In another embodiment as shown in FIG. 7, the client further includes: a receiving module 601, configured to receive a prop recommendation list switching request; a determining module 602, configured to determine a second prop recommendation list according to the prop recommendation list switching request; and a switching module 603, configured to replace a first prop recommendation list with the second prop recommendation list.

In one embodiment, the client may provide multiple prop recommendation lists, and when a user is unsatisfied with the current prop recommendation list, the user may select another prop recommendation list, and the client seamlessly switches to a new prop recommendation list.

Figure 8:
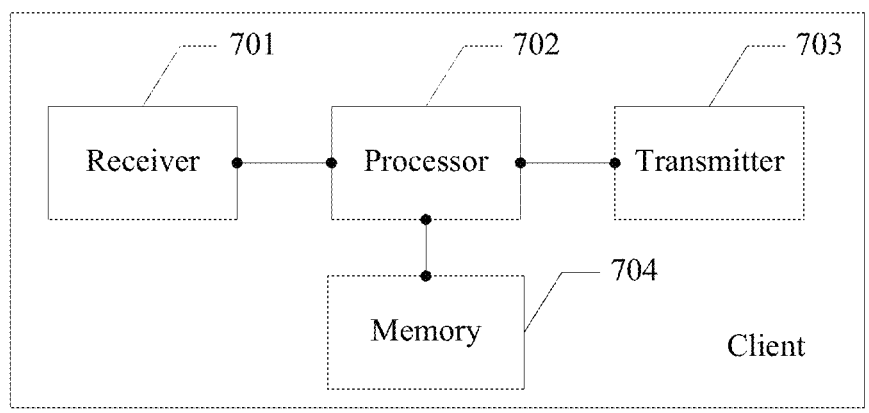
FIG. 8 is a schematic diagram of another embodiment of a client according to an embodiment of the present disclosure.

The foregoing describes the client in this embodiment of the present disclosure from the perspective of modularized function entities. The following describes the client in this embodiment of the present disclosure from the perspective of hardware processing. Referring to FIG. 8, the client in this embodiment of the present disclosure includes: a receiver 701, a processor 702, a transmitter 703, and a memory 704.

The client involved in this embodiment of the present disclosure may include more or fewer components than those shown in FIG. 8, and may combine two or more components, or may include different component configurations or devices. The components may be implemented in hardware including one or more signal processing and/or application-specific integrated circuits, software, or a combination of hardware and software.

The receiver 701 is configured to identify a target object that is in a target application and that is being operated currently, the target application being installed on a user device.

The processor 702 is configured to invoke instructions stored in the memory 704 to create a first prop recommendation list according to the target object, the first prop recommendation list including at least two virtual props, each of the virtual props having a different recommendation priority, and a recommendation priority of each of the virtual props being positively correlated to a matching degree between the virtual prop and the target object.

The transmitter 703 is configured to, if it is determined that a target virtual prop in the first prop recommendation list meets a preset recommendation rule, sending the target virtual prop to the user device according to a recommendation priority of the target virtual prop.

The memory 704 is configured to store instructions needed by the processor 702 to execute corresponding operations.

In one embodiment, because a first prop recommendation list created by a client is correlated to a currently operated virtual object, it is avoided that a virtual prop that is not suitable for a currently operated virtual object is recommended to a user; and in addition, a target virtual prop that meets a preset recommendation rule is filtered out from the first prop recommendation list, to avoid repeated recommendation. Therefore, the present disclosure can accurately recommend a suitable virtual prop to a user.

In some embodiments, the processor 702 is further configured to, before the transmitter 703 sends the target virtual prop to the user device according to the recommendation priority of the target virtual prop, determine whether the target virtual prop in the first prop recommendation list matches the virtual prop database of the target object, where the virtual prop database stores existing virtual props of the target object; and if the target virtual prop in the first prop recommendation list does not match the virtual prop database of the target object, determine that the target virtual prop in the first prop recommendation list meets the preset recommendation rule.

In one embodiment, whether the target virtual prop in the first prop recommendation list meets the preset recommendation rule is determined by determining whether the target virtual prop in the first prop recommendation list matches the virtual prop database of the target object, thereby completing the technical solutions of the present disclosure.

Further, the processor 702 is further configured to execute the following operation: determining whether the target virtual prop exists in the virtual prop database of the target object, and if the target virtual prop does not exist in the virtual prop database, determining that the target virtual prop in the first prop recommendation list does not match the virtual prop database of the target object; or determining whether a virtual prop matching an attribute of the target virtual prop exists in the virtual prop database of the target object, and if the target virtual prop does not exist in the virtual resource database, determining that the target virtual prop in the first prop recommendation list does not match the virtual prop database of the target object.

In some embodiments, determining whether the target virtual prop matches the virtual prop database is implemented using one or more of at least two example methods as described above.

In some embodiments, if the target virtual prop includes a first virtual prop and a second virtual prop, the transmitter 703 is configured to execute the following operation: sending the first virtual prop to the user device if it is determined that a recommendation priority of the first virtual prop is greater than a recommendation priority of the second virtual prop; and sending the second virtual prop to the user device after it is determined that the first virtual prop is added to the virtual prop base of the target object.

Further, the processor 702 is further configured to execute the following operation: before the transmitter 703 sends the second virtual prop to the user device, determining whether available resources in the virtual resource database of the target object are not less than resources required by the second virtual prop, and if the available resources are not less than the resources required by the second virtual prop, executing the operation of sending the second virtual prop to the user device.

Further, the transmitter 703 is further configured to execute the following operation: sending a precursory virtual prop of the second virtual prop to the user device if the available resources in the virtual resource database of the target object are less than the resources required by the second virtual prop, the precursory virtual prop being usable to synthesize the second virtual prop.

In one embodiment, an actual situation whether the available resources in the virtual resource database meet the resources required by the second virtual prop is considered. The client sends the second virtual prop to the user device only on the condition that the available resources in the virtual resource database meet the resources required by the second virtual prop, to avoid the problem that the second virtual prop cannot be added to the virtual prop database of the target object. Moreover, if the available resources in the virtual resource database do not meet the resources required by the second virtual prop, the client may further select to send the precursory virtual prop of the second virtual prop to the user device.

In some embodiments, the receiver 701 is further configured to execute the following operation: receiving a prop recommendation list switching request.

Correspondingly, the processor 702 is further configured to execute the following operations: determining a second prop recommendation list according to the prop recommendation list switching request; and replacing a first prop recommendation list with the second prop recommendation list.

In one embodiment, the client may provide multiple prop recommendation lists, and when a user is unsatisfied with the current prop recommendation list, the user may select another prop recommendation list, and the client seamlessly switches to a new prop recommendation list.

Figure 9:
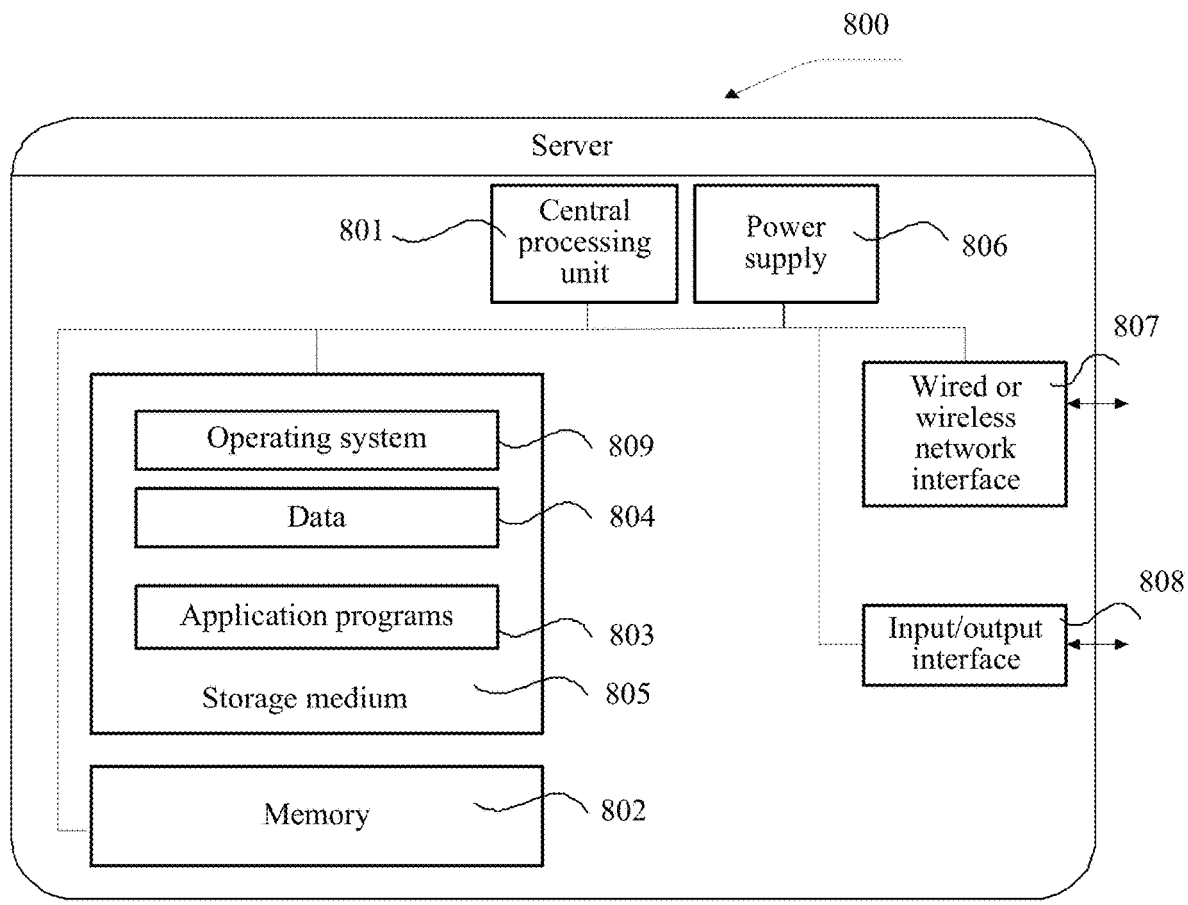
FIG. 9 is a schematic diagram of another embodiment of a server according to an embodiment of the present disclosure.

An embodiment of the present disclosure further provides a server. FIG. 9 is a schematic structural diagram of a server according to an embodiment of the present disclosure. The server 800 greatly differs due to different configurations or performances. The server may include one or more central processing units (CPUs) 801 (for example, one or more processors) and a memory 802, and storage media 805 (for example, one or more mass storage devices) on which application programs 803 and data 804 are stored. The memory 802 and the storage medium 805 may be transitory or non-transitory storages. A program stored in the storage medium 805 may include one or more modules (not shown in the figure), and each module may include a series of instructions and operations for the server. Still further, the CPU 801 may be configured to communicate with the storage medium 805, and perform, on the server 800, a series of instructions and operations according to the instructions stored in the storage medium 805.

The server 800 may further include one or more power supplies 806, one or more wired or wireless network interfaces 807, one or more input/output interfaces 808, and/or one or more operating systems 809 stored on the storage medium 805, for example, Windows Server™, Mac OS X™, Unix™, Linux™, or FreeBSD™.

The steps performed by the client in the foregoing embodiments may be based on the server structure shown in FIG. 9.

A person skilled in the art may clearly understand that, for convenient and clear description, for specific working processes of the foregoing described system, apparatus, and unit, reference may be made to corresponding processes in the foregoing method embodiments, and details are not described herein again.

The embodiments of the present disclosure provide a method and an apparatus for obtaining a virtual resource of a virtual object, which are applied to the field of interactive application communications technologies. The smoothness of an interactive application can be improved and the efficiency of obtaining a plug-in resource can be improved. An operation of obtaining a virtual resource can be completed rapidly and conveniently on the precondition of not affecting the smoothness of the interactive application. Descriptions are provided in detail below.

A terminal device in the present disclosure is installed with an interactive application (or referred to as a client). The interactive application includes an application interface. The virtual object refers to a virtual role that runs the interactive application, such as a hero role in a game.

The resource assisting manner may be a resource plug-in manner, and corresponds to information of plug-in resources to be recommended to the virtual object in an entire process of using the interactive application, and a sequence of recommending the plug-in resources. The plug-in resource refers to a resource that is designed in the interactive application and that can have assisting and enhancing functions for operations of the virtual object when the virtual object uses the interactive application. For example, in a game, the plug-in resource may be certain equipment, and the equipment can improve a capability parameter of a hero. Plug-in refers to additional tools and instruments that are used to assist the virtual object and that are added to an original virtual object by the virtual object by controlling a system.

Both an icon corresponding to the resource plug-in manner and an icon corresponding to the plug-in resource may be directly displayed on the application interface, and may be displayed on a same region or different regions. The specific display manner and display position are not limited in the present disclosure. In an actual application scenario, a plug-in resource panel may be set on the application interface, an icon of a recommended plug-in resource may displayed on the panel by regions, and an icon of the resource plug-in manner may be displayed on the panel. In some embodiments, an entry of the resource plug-in manner may be displayed on the panel, and information about the plug-in resource in the resource plug-in manner may be edited by using the entry, such as adding a new plug-in resource or deleting a redundant plug-in resource, so that the resource plug-in manner is more suitable for battles, and is also an optimization for the resource plug-in manner. If more than two resource plug-in manners are configured, the entry may be used to switch to another resource plug-in manner in real time by only clicking to select, without the need of opening another new interface, thereby simplifying operations and improving the smoothness of the application interface.

In the present disclosure, each virtual object may log in to an application interface of an interactive application, and then interact with other virtual objects on the application interface.

The terminal device may be any terminal device such as a mobile phone, a tablet computer, a personal digital assistant (PDA), a Point of Sales (POS), or an in-vehicle computer.

To resolve the foregoing technical problems, the embodiments of the present disclosure provide at least the following technical solutions.

In an outside-the-battle preparation system, at least one resource assisting manner is set in the terminal device. For example, the resource assisting manner is set to a resource plug-in manner. The resource plug-in manner may be edited by the terminal device, or may be recommended by a system, or may be recommended by a master (e.g., a master player), which is not limited in the present disclosure. After entering a battle, the terminal device first determines a resource plug-in manner of a virtual object, then determines, according to the resource plug-in manner, plug-in resources that meet a plug-in condition, and then displays an icon corresponding to the resource plug-in manner and icons corresponding to the plug-in resources on an application interface, so that the virtual object may obtain the displayed plug-in resource on the application interface at any time, without the need of opening another interface for obtaining a plug-in resource and seeking the needed plug-in resource. Therefore, it can be seen that, using this solution can ensure the smoothness of the interactive application and improving the efficiency of obtaining the plug-in resource.

It should be noted that, the apparatus for obtaining a plug-in resource in the present disclosure may be set at an apparatus end, and in some scenarios, may also be set in the terminal device as a client for obtaining a plug-in resource. In the following embodiments of the present disclosure, an example in which the apparatus is set in a terminal device end as a server end is mainly used. If the apparatus is a client set in the terminal device, when the plug-in resource of the virtual object is being obtained, the operation of obtaining the plug-in resource may be completed by the client. Which type of device the apparatus is for performing the methods as described in this disclosure is not limited to the examples described in the present disclosure.

Figure 10:
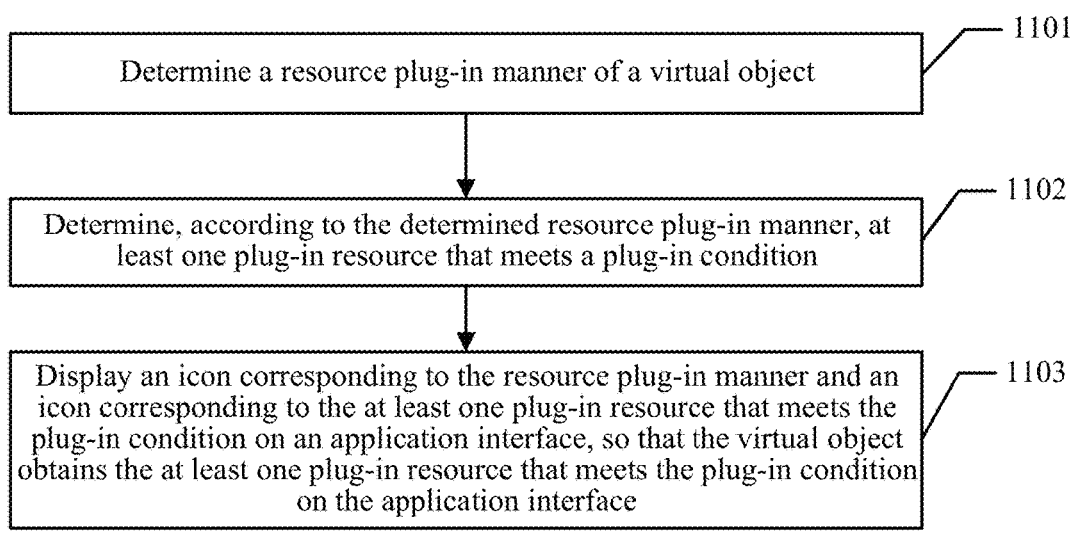
FIG. 10 is a schematic diagram of a method for obtaining a plug-in resource of a virtual object in this embodiment.

Referring to FIG. 10, the following describes a method for obtaining a plug-in resource of a virtual object provided in the present disclosure by using examples. The method is performed by a terminal device installed with a client, and specific plug-in resource information and a specific resource plug-in manner may be obtained from a server by the client, or provided by the client, which is not specifically limited in the present disclosure. This embodiment of the present disclosure includes:

1101. Determine a resource plug-in manner of a virtual object.

The resource assisting manner of the virtual object may be a resource plug-in manner, and may correspond to information of plug-in resources and an obtaining sequence of the plug-in resources. For example, when the plug-in resource is a virtual item such as equipment, the resource plug-in manner may correspond to information of the equipment and a purchase sequence of the equipment.

1102. Determine, according to the determined resource plug-in manner, at least one plug-in resource that meets a plug-in condition.

1103. Display an icon corresponding to the resource plug-in manner and an icon corresponding to the at least one plug-in resource that meets the plug-in condition on an application interface, so that the virtual object obtains the at least one plug-in resource that meets the plug-in condition on the application interface.

The application interface may be displayed on a user device, and an assisting condition may be a plug-in condition, including: reaching the obtaining sequence of the plug-in resources, having sufficient account balances of the virtual object, and being in a different type and a different level from the existing plug-in resources of the virtual object. For example, when the plug-in resource is a virtual item such as equipment, the plug-in condition may be referred to as a purchase condition. The purchase condition may include: reaching the obtaining sequence of the equipment, having sufficient account balances of the virtual object, and being in a different type and a different level from the existing equipment of the virtual object.

The condition of being in a different type and a different level from the existing equipment of the virtual object may be understood as: if the virtual object has purchased equipment of type I previously, and equipment recommended by the currently selected resource plug-in manner is also equipment of type I, and if the two pieces of equipment also are in a same level, the virtual object may not have a superposition effect, so that the equipment does not need to be purchased; and if the level of the equipment of type I recommended by the current resource plug-in manner is already higher than the level of the purchased equipment of type I, the purchase condition is met, and correspondingly, the icon of the equipment may be displayed on the application interface, for the virtual object to execute a normal purchase operation. Certainly, if the virtual object has not purchased the equipment of type I previously, and the equipment recommended by the currently selected resource plug-in manner is equipment of type II, the purchase condition is also met, and the icon of the equipment of type II is displayed on the application interface.

Compared with the existing mechanism, in this embodiment of the present disclosure, at least one resource plug-in manner is preset, so that after entering the application interface, the terminal device may first determine a resource plug-in manner, and may determine, according to the resource plug-in manner, a plug-in resource that meets a plug-in condition. A player who controls the virtual object does not need to match with a plug-in resource in real time, and the player may be guided to obtain a plug-in resource suitable for the current battle situation. Therefore, the barrier for using the interactive application can be reduced to some extent. Then, an icon corresponding to the resource plug-in manner and an icon corresponding to at least one plug-in resource that meets the plug-in condition are displayed on the application interface, so that the virtual object can directly obtain the plug-in resource that meets the plug-in condition on the application interface, and does not need a complex process of opening another new window, to first find a to-be-used plug-in resource, and then enter an obtaining interface, so that operations of the virtual object for obtaining the plug-in resource can be reduced, and the battles can be more smooth. Therefore, it can be seen that, this solution can improve the efficiency of obtaining the plug-in resource.

In addition, if multiple components (e.g., precursory virtual resources) are need to synthesize some plug-in resources into a complete plug-in resource, the plug-in resource recommended in the resource plug-in manner has some guidance performance, the player does not need to match with various components to generate a complete plug-in resource, thereby reducing time for searching, collocating, and generating complete equipment.

In some embodiments of the present disclosure, after the icon corresponding to the resource plug-in manner and the icon corresponding to the at least one plug-in resource that meets the plug-in condition are displayed on the application interface, if the current existing plug-in resource of the virtual object changes, for example, fails, a new plug-in resource is recommended to the virtual object according to the selected resource plug-in manner.

The terminal device may traverse virtual resources that correspond to the selected resource plug-in manner to determine a new plug-in resource to be recommended continuously and that meets the plug-in condition.

Specifically, when determining that there exists a target virtual resource that reaches the obtaining sequence of the plug-in resources, has sufficient account balances of the virtual object, and is in a different type from the existing plug-in resources of the virtual object, the terminal device may add the target plug-in resource to a resource queue (e.g., a virtual resource database of a virtual object or a part of the virtual resource database), and update the resource queue. After the plug-in resource on the application interface is obtained by the virtual object, the plug-in resource in the resource queue may be displayed on the application interface as a substitution. The resource queue may refer to a queue of plug-in resources to be displayed on the application interface, and the plug-in resources in the resource queue are arranged according to an obtaining sequence indicated in the resource plug-in manner. For example, when the plug-in resource is a virtual item such as equipment, the resource queue may be a purchase queue of equipment. The purchase queue refers to a queue of equipment that meets a purchase condition and that is to be displayed on the application interface. After the equipment on the application interface is purchased, the equipment in the purchase queue is displayed on the application interface as a substitution. When determining that there exists target equipment that reaches the purchase sequence of certain equipment, has sufficient account balances of the virtual object, and is in a different type from the existing equipment of the virtual object, the terminal device may add the target equipment to the purchase queue, and update the purchase queue.

Figure 11:
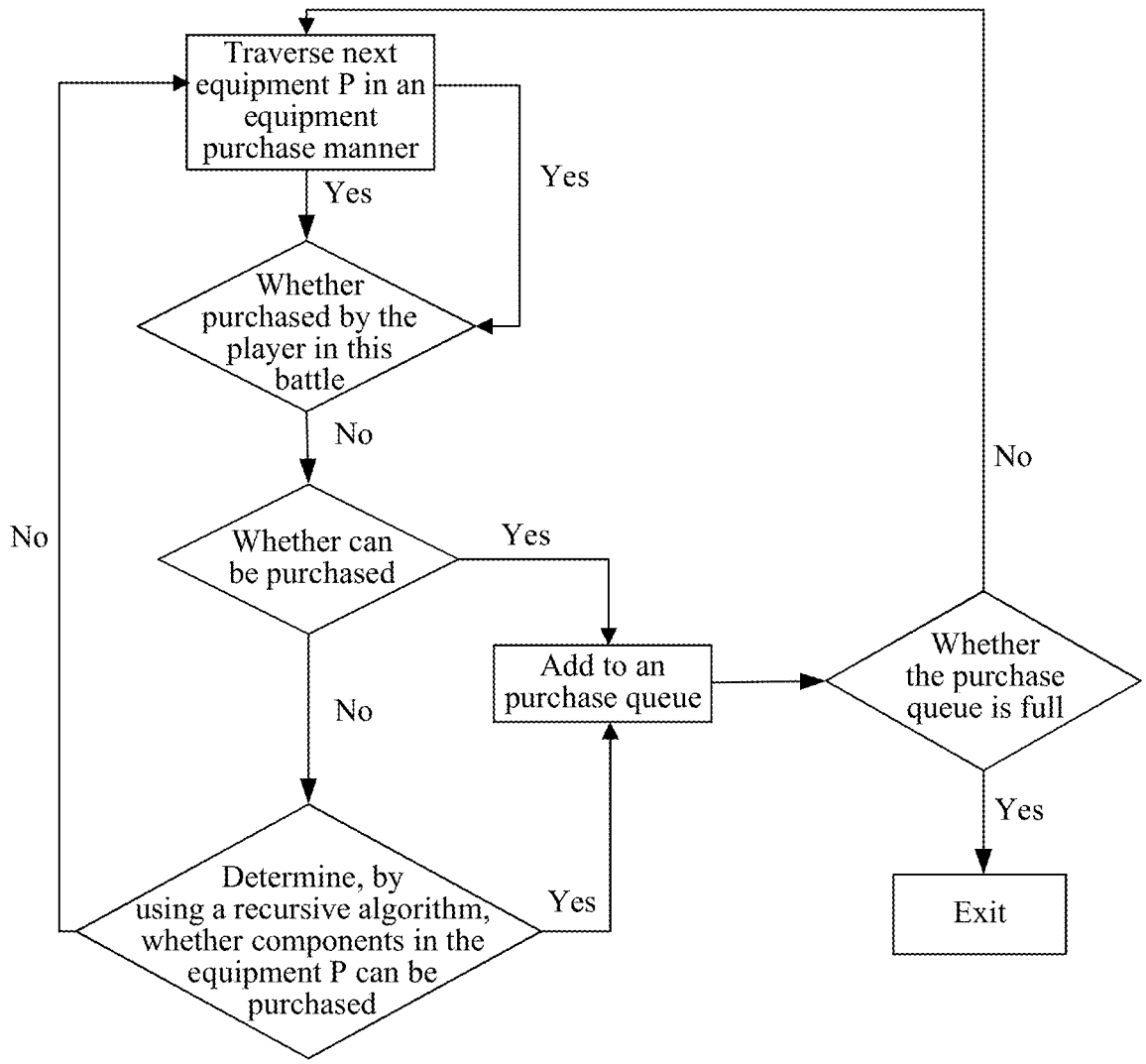
FIG. 11 is a flowchart of purchasing equipment in this embodiment.

The following explained the traversing operations based on examples including using a plug-in resource as equipment, a client as an interactive application, and a resource plug-in manner as an equipment purchase manner. The client is installed on the terminal device, the current interface of the client is a battle interface, and the battle interface displays a current battle situation and an equipment purchase panel. As shown in FIG. 11, in a battle process, when inside a current battle gold coins of a virtual role controlled by a player change or the existing equipment changes, the client may determine, according to the equipment purchase manner selected by the current player, whether there is existing equipment that can be quickly purchased, and if there exists equipment that can be quickly purchased, refreshes the equipment purchase panel, that is, displays several pieces of equipment in the purchase queue on the equipment purchase panel, for the player to purchase.

If the purchase queue changes, refresh the equipment purchase panel on the battle interface, display some newly-added equipment icons, or hide some failed equipment icons. The player only needs to click the corresponding equipment icons to complete the purchase operation. If multiple components are needed to synthesize some equipment into a piece of complete equipment, the equipment recommended in the equipment purchase manner has some guidance performance, the player does not need to match with various components to generate a piece of complete plug-in equipment, thereby reducing time for searching, collocating, and generating complete equipment.

In FIG. 11, the client may monitor an equipment change situation of a virtual role controlled by a player. The Client may, when the equipment changes, traverse next equipment P indicated by the currently selected equipment purchase manner, and if the equipment P has been purchased by the player in this battle, continue to traverse next equipment indicated by the equipment purchase manner. When it is determined that certain equipment has not been purchased by the player in this battle, the client enters a determining process of a purchase condition. If the equipment P has never been purchased by the player in this battle, the client first determines whether the equipment meets the purchase condition, and if the equipment meets the purchase condition, adds the equipment P to the purchase queue; if the equipment P cannot be purchased, the client may determine, by using a recursive algorithm, whether components of the equipment P may be purchased, and if the components of the equipment P may be purchased, the client also adds the components of the equipment P to the purchase queue. Then, the client determines whether equipment icons on the equipment purchase panel are full, if the equipment icons are full, the client exits the process of traversing the equipment, and if the equipment icons are not full, the client continues to traverse next equipment that may be purchased.

In an actual application scenario, because when a virtual object fights against other virtual objects by using an interactive application, a capability attribute of the virtual object also changes with the change of a battle situation, and capability parameters of other virtual objects may be stronger than those of the virtual object. If the virtual object continues to use the current resource plug-in manner, the battle level of the virtual object may be affected, or even the virtual object loses the battle. Therefore, considering that the resource plug-in manner selected by the terminal device may be no longer suitable for the current battle situation, after an icon corresponding to the resource plug-in manner and an icon corresponding to at least one plug-in resource are displayed on the application interface, a user who controls the virtual object may flexibly select to switch to another suitable resource plug-in manner on the application interface according to the current battle situation, to rapidly cope with the current battle. Specifically, the virtual object inputs an operation instruction for the icon corresponding to the resource plug-in manner on the application interface, and the terminal device receives the operation instruction of the virtual object. The operation instruction is an instruction sent when the virtual object determines, according to battle situation information of the virtual object, that the currently selected resource plug-in manner is not suitable for the current battle situation.

Then, the terminal device responds to the operation instruction, and updates the resource plug-in manner of the virtual object, for example, switches to another resource plug-in manner suitable for the current battle situation, or modifies the currently used resource plug-in manner.

In some embodiments of the present disclosure, the resource plug-in manner may be configured by the terminal device, or may be configured by the server and recommended to the terminal device. The resource plug-in manner recommended by the server may be recommendations from system agent or system artificial intelligent, or may be from master recommendation. The resource plug-in manner recommended by the server can reduce the barrier for controlling the virtual object, so that a beginner can also achieve good results in the interactive application according to the resource plug-in manner recommended by the server, thereby improving the control efficiency. The master recommendation is obtained by calculating a large amount of data by the server, and may be obtained by the server by calculating plug-in resources and an obtaining sequence of the plug-in resources used when various users who control the virtual object are in actual battle situations. Details are provided as follows:

The virtual object and other virtual objects send interactive data of the virtual object to the server in real time.

Then, the server calculates, according to the interactive data and interactive data sent by other terminals, comprehensive parameter values corresponding to resource plug-in manners, sorts priorities of the resource plug-in manners according to the comprehensive parameter values of the resource plug-in manners, and sends resource plug-in manners whose comprehensive parameter values are higher than a preset threshold to the terminal device.

The interactive data includes the used virtual object, the number of wins corresponding to the resource plug-in manners, win rates corresponding to the resource plug-in manner, and plug-in resources obtained by the virtual object.

Therefore, it can be seen that, because the resource plug-in manner recommended by a master is obtained by comprehensively calculating battle situations of multiple actual battles, the obtained resource plug-in manner recommended by a master is more suitable for actual battles, and has high reality, objectivity, and reliability. As such, even though a player who controls the virtual object does not understand the entire battle situation, the player can also be familiar with the entire battle situation rapidly according to the recommended resource plug-in manner, to learn what plug-in resources may be used in specific situations to improve win rates of battles, thereby reducing the barrier for controlling the virtual object. Specifically, the server calculates the comprehensive parameter values by using the following calculation manner:

Comprehensive parameter value=min(wins,$a$)+win rates*[(wins>=$b$)?$c$:0]+player score*$d$.

a, b, c, and d are configurable weight parameters, and may be a fixed or non-fixed value. Specific values may be configured flexibly.

a=maximum wins corresponding to a resource plug-in manner=1000000, b=minimum wins corresponding to the resource plug-in manner=100, c=win rate bonus coefficient of the resource plug-in manner=10000, and d=score bonus coefficient of player who uses the resource plug-in manner=100.

By setting the foregoing four weight parameters, a weight between wins and win rates can be effectively balanced, and the resource plug-in manner may be updated according to advice of players, so that the recommended resource plug-in manner is more suitable for actual battles, and is more objective, guiding, and effective. In addition, the calculation formula of the comprehensive parameter values given in the present disclosure is only a non-limiting example. Variations may be made based on the calculation formula in actual scenarios, and specific forms are not limited in the present disclosure.

After comprehensive parameter values of various resource plug-in manners are calculated, the server may sort the resource plug-in manners in an ascending order of the comprehensive parameter values, and recommend resource plug-in manners with top rankings to the terminal device, so that in an initialized state of an outside-the-battle preparation system, the player may directly select a suitable manner from the resource plug-in manners recommended by the server, for next battles, thereby reducing time for the player in configuring the resource plug-in manner. This can further actually help fight in a battle.

Figure 12:
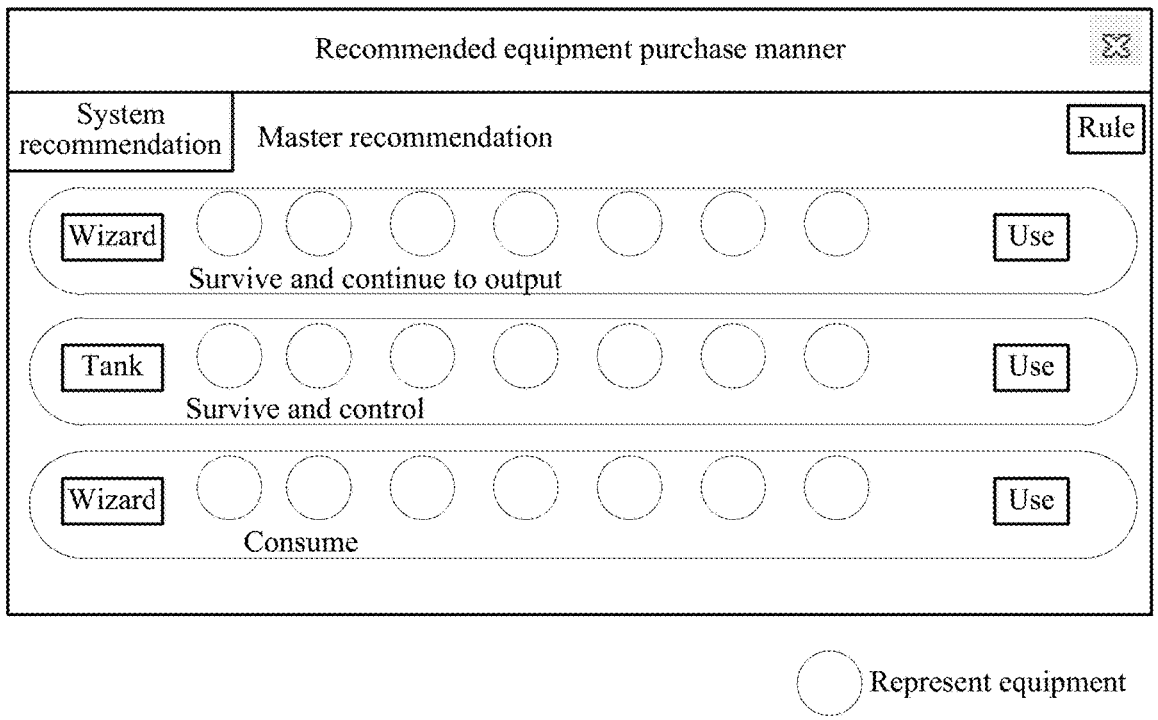
FIG. 12 is a schematic interface diagram of an equipment purchase manner in this embodiment.

For the equipment purchase manner recommended by a master, reference may be made to the interface described in FIG. 12. FIG. 12 displays three categories of equipment for three types of virtual role, including one tank and two wizards with different levels. Each category of equipment correspondingly prompts a function of the equipment, for a player to understand and select. For example, a panel corresponding to a first category of equipment for wizards of a particular level includes seven pieces of equipment, and has the function of "survive and continuous output". The player only needs to first select an icon of any equipment on the panel, and then click a "use" button on the panel on which the category of equipment is located, to obtain the equipment.

Figure 13:
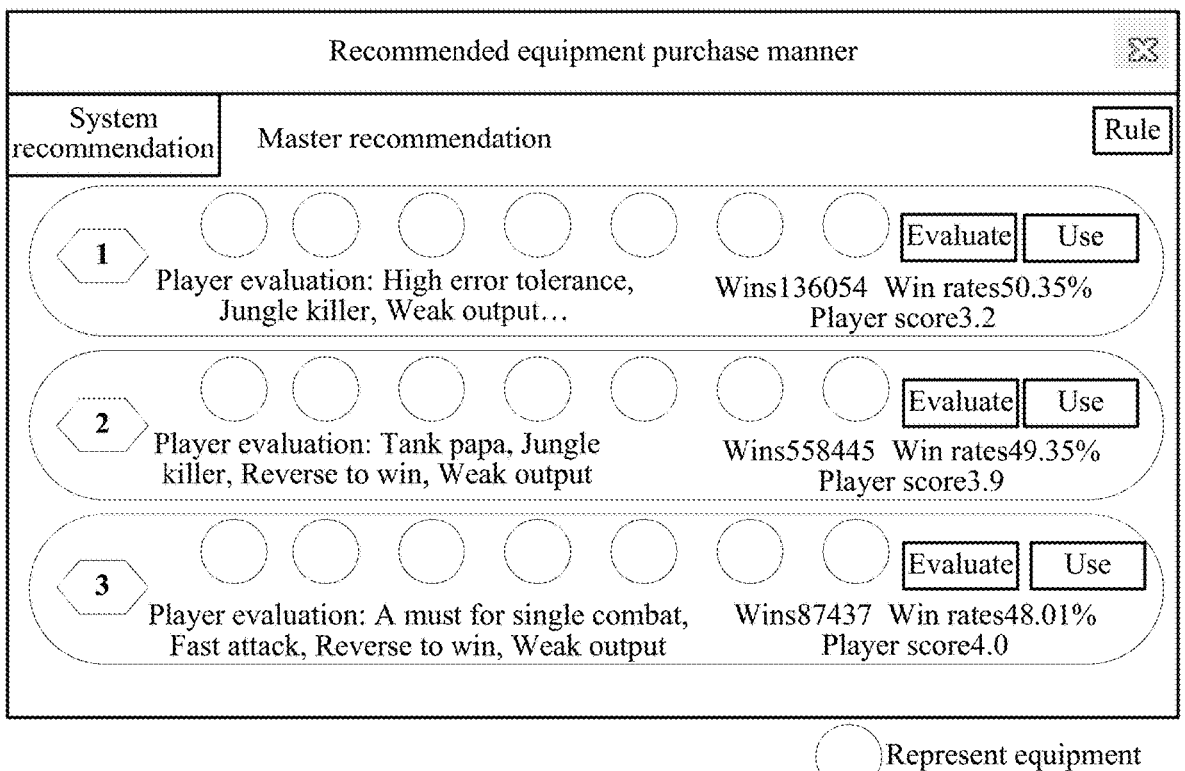
FIG. 13 is another schematic interface diagram of an equipment purchase manner in this embodiment.

FIG. 13 is an interface displaying various comprehensive parameter values of an equipment purchase manner recommended by a master. In FIG. 13, descriptions of player evaluation, wins, win rates, and player scores for each category of equipment are provided on a panel of each category of equipment, so that the player can rapidly filter out expected equipment. In addition, each panel includes buttons of "use" and "evaluate" for the category of equipment. The player only needs to click the "use" button to complete a purchase operation. In this battle or after the battle ends, the player may further click the "evaluate" button on the panel to enter an evaluation interface shown in FIG. 14, to evaluate the performance of the equipment in this battle.

Figure 14:
FIG. 14 is another schematic interface diagram of an equipment purchase manner in this embodiment.

FIG. 14 is an interface of scores of an equipment purchase manner selected in this battle. In FIG. 14, a player may evaluate an equipment purchase manner selected in this battle. Specific details are shown in FIG. 14, and are not described herein again.

The foregoing describes a method for obtaining a plug-in resource of a virtual object in the present disclosure. The following describes the terminal device for executing the foregoing method for obtaining a plug-in resource of a virtual object.

Figure 15:
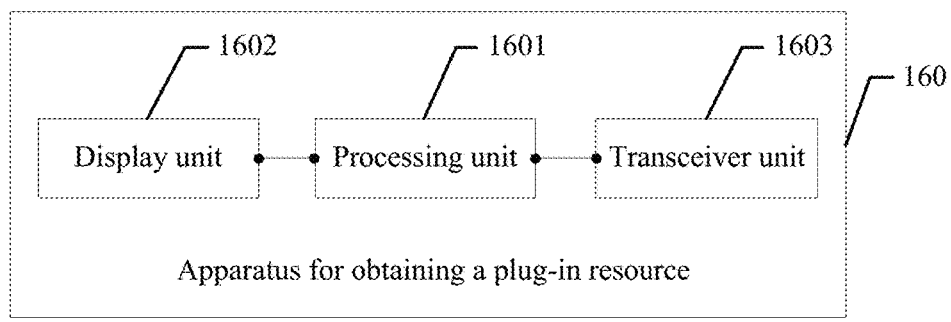
FIG. 15 is a schematic structural diagram of an apparatus for obtaining a plug-in resource in this embodiment.

Referring to FIG. 15, the terminal device 160 is described, and the terminal device 160 includes a processing unit 1601, a display unit 1602, and a transceiver unit 1603. The processing unit 1601 is configured to determine a resource plug-in manner of a virtual object, and determine, according to the determined resource plug-in manner, at least one plug-in resource that meets a plug-in condition. The display unit 1602 is configured to display an icon corresponding to the resource plug-in manner determined by the processing unit 1601 and an icon corresponding to the at least one plug-in resource that meets the plug-in condition on an application interface, so that the virtual object can obtain the at least one plug-in resource that meets the plug-in condition on the application interface.

The resource plug-in manner corresponds to information of plug-in resources and an obtaining sequence of the plug-in resources.

The plug-in condition includes: reaching the obtaining sequence of the plug-in resources, having sufficient account balances of the virtual object, and being in a different type and a different level from the existing plug-in resources of the virtual object.

In one embodiments of the present disclosure, the processing unit 1601 determines a resource plug-in manner of a virtual object, and then determines, according to the determined resource plug-in manner, at least one plug-in resource that meets a plug-in condition, so that the virtual object does not need to match with a plug-in resource, for lower the barrier of using an interactive application. Then, the display unit 1602 displays an icon corresponding to the resource plug-in manner and an icon corresponding to the at least one plug-in resource that meets the plug-in condition on an application interface, so that the virtual object can directly obtain the plug-in resource that meets the plug-in condition on the application interface, and does not need a complex process of opening another new window to first find a to-be-used plug-in resource, and then enter an obtaining interface. This solution can improve the efficiency of obtaining the plug-in resource.

In some embodiments of the present disclosure, after the display unit 1602 displays the icon corresponding to the resource plug-in manner and the icon corresponding to the at least one plug-in resource that meets the plug-in condition on the application interface, the processing unit 1601 is further configured to traverse the virtual resources corresponding to the selected resource plug-in manner when the current existing plug-in resource of the virtual object changes; and when it is determined that there exists a target virtual resource that meets the obtaining sequence of the plug-in resources, has sufficient account balances of the virtual object, and is in a different type and a different level from the existing plug-in resources of the virtual object, add the target plug-in resource to a resource queue, and update the resource queue.

In some embodiments of the present disclosure, after the display unit 1602 displays the icon corresponding to the resource plug-in manner and the icon corresponding to the at least one plug-in resource on the application interface, the processing unit 1601 is further configured to receive an operation instruction of the virtual object by using the transceiver unit 1603, the operation instruction being an instruction sent by the virtual object when it is determined, according to battle situation information of the virtual object, that the currently selected resource plug-in manner is not suitable for the current battle situations; and update the resource plug-in manner of the virtual object in response to the operation instruction.

In some embodiments of the present disclosure, the transceiver unit 1603 is further configured to send interactive data of the virtual object to a server, so that the server calculates, according to the interactive data and interactive data sent by other terminals, comprehensive parameter values corresponding to resource plug-in manners, sorts priorities of the resource plug-in manners according to the comprehensive parameter values of the resource plug-in manner, and sends resource plug-in manners whose comprehensive parameter values are higher than a preset threshold to the terminal device.

The interactive data includes the used virtual object, the number of wins corresponding to the resource plug-in manners, win rates corresponding to the resource plug-in manner, and plug-in resources obtained by the virtual object.

The embodiments of the present disclosure further provide a client, and for descriptions of the composition modules of the client, reference may be made to the foregoing embodiments. The client includes: an obtaining module, configured to identify a virtual object that is in a target application and that is being operated currently, the target application being installed on a user device; a processing unit, configured to determine a resource assisting manner of the virtual object; and a display unit, configured to display an icon corresponding to the resource assisting manner determined by the processing unit and an icon corresponding to at least one virtual resource that meets an assisting condition on an application interface of the user device, so that the virtual object obtains the at least one virtual resource that meets the assisting condition on the application interface.

In some embodiments of the present disclosure, the client further includes: a creation module, configured to create a first resource recommendation list according to the virtual object, the first resource recommendation list including at least two virtual resources, each of the virtual resources having a different recommendation priority, and a recommendation priority of each of the virtual resources being positively correlated to a matching degree between the virtual resource and the virtual object; and a sending module, configured to: if it is determined that a target virtual resource in the first resource recommendation list meets a preset recommendation rule, send the target virtual resource to the user device according to a recommendation priority of the target virtual resource.

In some embodiments of the present disclosure, the client further includes: a determining module, configured to: before the sending module sends the target virtual resource to the user device according to the recommendation priority of the target virtual resource, determine whether the target virtual resource in the first resource recommendation list matches a virtual resource database of the virtual object; and if the target virtual resource does not match the virtual resource database, determine that the target virtual resource in the first resource recommendation list meets the preset recommendation rule.

In some embodiments of the present disclosure, the determining module is configured to determine whether the target virtual resource exists in the virtual resource database of the virtual object, and if the target virtual resource does not exist in the virtual resource database, determine that the target virtual resource in the first resource recommendation list does not match the virtual resource database of the virtual object. In some other embodiments, the determining module is configured to determine whether a virtual resource matching an attribute of the target virtual resource exists in the virtual resource database of the virtual object, and if the target virtual resource does not exist in the virtual resource database, determine that the target virtual resource in the first resource recommendation list does not match the virtual resource database of the virtual object.

In some embodiments of the present disclosure, if the target virtual resource includes a first virtual resource and a second virtual resource, the sending module is configured to send the first virtual resource to the user device if it is determined that a recommendation priority of the first virtual resource is greater than a recommendation priority of the second virtual resource; and send the second virtual resource to the user device after it is determined that the first virtual resource is added to the virtual resource database of the virtual object.

In some embodiments of the present disclosure, the determining module is further configured to: before the sending module sends the second virtual resource to the user device, determine whether available resources in the virtual resource database of the virtual object are not less than resources required by the second virtual resource, and if the available resources are not less than the resources required by the second virtual resource, execute the operation of sending the second virtual resource to the user device.

In some embodiments of the present disclosure, the sending module is further configured to send a precursory virtual resource of the second virtual resource to the user device if the remaining resource in the virtual resource database of the virtual object are less than the resources required by the second virtual resource, the precursory virtual resource being usable to synthesize the second virtual resource.

In some embodiments of the present disclosure, the resource assisting manner corresponding to information of virtual resources and an obtaining sequence of the virtual resources; and the assisting condition includes: reaching the obtaining sequence of the virtual resources, having sufficient account balances of the virtual object, and being in a different type and a different level from the existing virtual resources of the virtual object.

In some embodiments of the present disclosure, after the display unit displays the icon corresponding to the resource assisting manner and the icon corresponding to the at least one virtual resource that meets the assisting condition on the application interface, the processing unit is further configured to: traverse virtual resources corresponding to the selected resource assisting manner when the current existing virtual resource of the virtual object changes; and when it is determined that there exists a target virtual resource that reaches the obtaining sequence of the virtual resources, has sufficient account balances of the virtual object, and is in a different type from the existing virtual resources of the virtual object, add the target virtual resource to a resource queue, and update the resource queue.

In some embodiments of the present disclosure, the client includes: a transceiver unit, and after the display unit displays the icon corresponding to the resource assisting manner and the icon corresponding to the at least one virtual resource that meets the assisting condition on the application interface, the processing unit is further configured to: receive an operation instruction of the virtual object by using the transceiver unit, the operation instruction being an instruction sent by the virtual object when it is determined, according to battle situation information of the virtual object, that the currently selected resource assisting manner is not suitable for the current battle situation; and update the resource assisting manner of the virtual object in response to the operation instruction.

In some embodiments of the present disclosure, the transceiver unit is further configured to: send interactive data of the virtual object to a server, so that the server calculates, according to the interactive data and interactive data sent by other terminals, comprehensive parameter values corresponding to resource assisting manners, sorts priorities of the resource assisting manners according to the comprehensive parameter values of the resource assisting manner, and sends resource assisting manners whose comprehensive parameter values are higher than a preset threshold to the user device, the interactive data including the used virtual object, the number of wins of the resource assisting manners, win rates of the resource assisting manner, and virtual resources obtained by the virtual object.

The foregoing describes the apparatus in this embodiment of the present disclosure from the perspective of unitized function entities. The following describes the apparatus in this embodiment of the present disclosure from the perspective of hardware processing.

Figure 16:
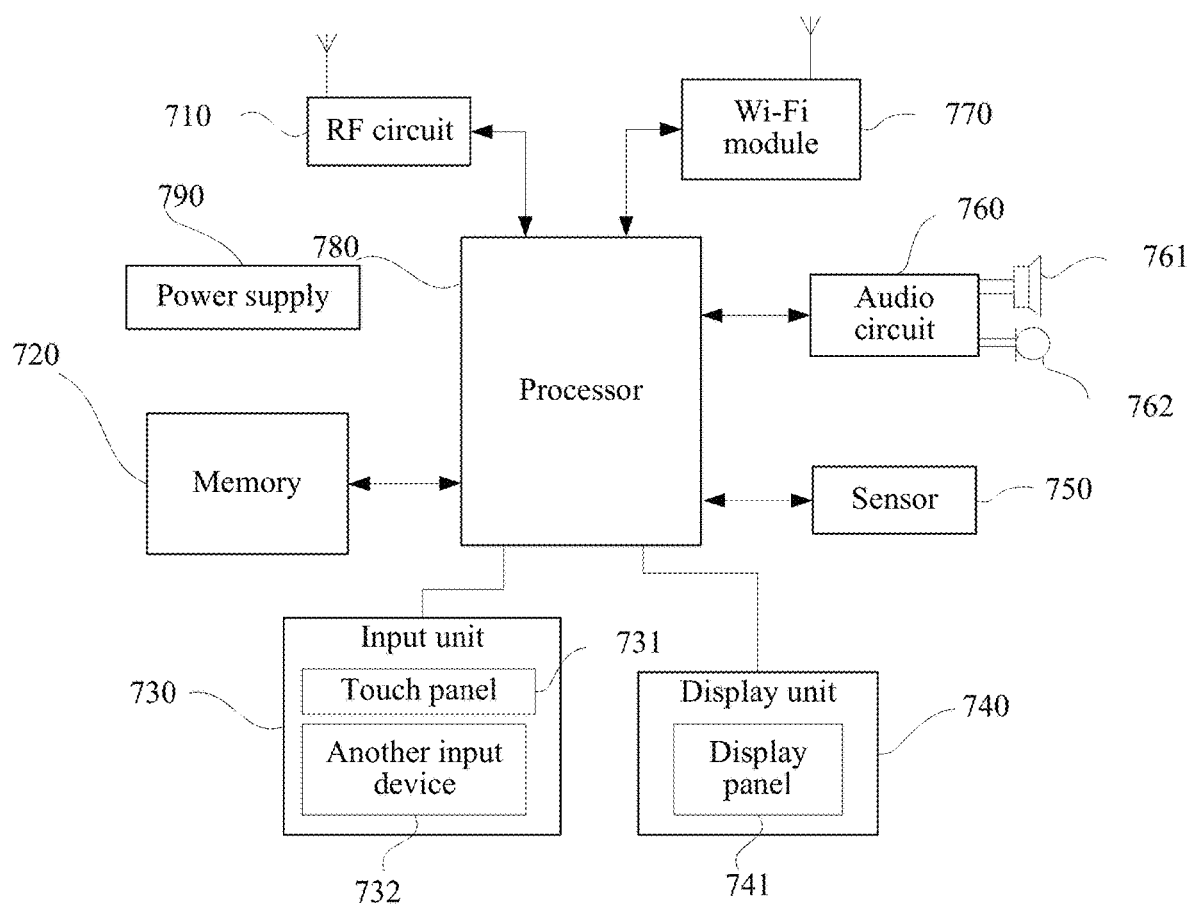
FIG. 16 is a schematic structural diagram of a mobile phone for obtaining a plug-in resource in this embodiment.

An embodiment of the present disclosure further provides a terminal device. The terminal device corresponds to a terminal device configured to perform a method for obtaining a plug-in resource of a virtual object. As shown in FIG. 16, for ease of description, FIG. 16 only shows a part related to this embodiment of the present disclosure. For undisclosed specific technical details, refer to the part of the method in the embodiments of the present disclosure. An example in which the terminal device is a mobile phone is used below.

FIG. 16 is a block diagram of a structure of a part of a mobile phone related to a mobile terminal according to an embodiment of the present disclosure. Referring to FIG. 16, the mobile phone includes components such as a radio frequency (RF) circuit 710, a memory 720, an input unit 730, a display unit 740, a sensor 750, an audio circuit 760, a wireless fidelity (Wi-Fi) module 770, a processor 780, and a power supply 790. A person skilled in the art may understand that the structure of the mobile phone shown in FIG. 16 does not constitute a limitation to the mobile phone, and the mobile phone may include more components or fewer components than those shown in the figure, or some components may be combined, or a different component deployment may be used.

The following describes the components of the mobile phone with reference to FIG. 16.

The RF circuit 710 may be configured to receive and send a signal during an information receiving and sending process or a call process. Specifically, the RF circuit receives downlink information from a base station, then delivers the downlink information to the processor 780 for processing, and sends related uplink data to the base station. Generally, the RF circuit 710 includes, but is not limited to, an antenna, at least one amplifier, a transceiver, a coupler, a low noise amplifier (LNA), and a duplexer. In addition, the RF circuit 710 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 720 may be configured to store a software program and module. The processor 780 runs the software program and module stored in the memory 720, to implement various functional applications and data processing of the mobile phone. The memory 720 may include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 720 may include a high speed random access memory, and may further include a non-volatile memory, such as a magnetic disk storage device, a flash memory, or other non-volatile solid-state storage devices.

The input unit 730 may be configured to receive input digit or character information, and generate a keyboard signal input related to the user setting and function control of the mobile phone. Specifically, the input unit 730 may include a touch panel 731 and another input device 732. The touch panel 731, which may also be referred to as a touch screen, may collect a touch operation of a user on or near the touch panel (such as an operation of a user on or near the touch panel 731 by using any suitable object or accessory such as a finger or a stylus), and drive a corresponding connection apparatus according to a preset program. In some embodiments, the touch panel 731 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 780. Moreover, the touch controller can receive and execute a command sent by the processor 780. In addition, the touch panel 731 may be a resistive, capacitive, infrared, or surface sound wave type touch panel. In addition to the touch panel 731, the input unit 730 may further include the another input device 732. Specifically, the another input device 732 may include, but is not limited to: one or more of a physical keyboard, a functional key (such as a volume control key or a switch key), a track ball, a mouse, and a joystick.

The display unit 740 may be configured to display information input by the user or information provided for the user, and various menus of the mobile phone. The display unit 740 may include a display panel 741. Optionally, the display panel 741 may be configured by using a liquid crystal display (LCD), an organic light-emitting diode (OLED), or the like. Further, the touch panel 731 may cover the display panel 741. After detecting a touch operation on or near the touch panel 731, the touch panel 731 transfers the touch operation to the processor 780, so as to determine a type of a touch event. Then, the processor 780 provides corresponding visual output on the display panel 741 according to the type of the touch event. Although, in FIG. 16, the touch panel 731 and the display panel 741 are used as two separate parts to implement input and output functions of the mobile phone, in some embodiments, the touch panel 731 and the display panel 741 may be integrated to implement the input and output functions of the mobile phone.

The mobile phone may further include at least one sensor 750, such as an optical sensor, a motion sensor, and other sensors. Specifically, the optical sensor may include an ambient light sensor and a proximity sensor. The ambient light sensor may adjust luminance of the display panel 741 according to brightness of the ambient light. The proximity sensor may switch off the display panel 741 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 760, a loudspeaker 761, and a microphone 762 may provide audio interfaces between the user and the mobile phone. The audio circuit 760 may convert received audio data into an electric signal and transmit the electric signal to the loudspeaker 761. The loudspeaker 761 converts the electric signal into a sound signal for output. On the other hand, the microphone 762 converts a collected sound signal into an electric signal. The audio circuit 760 receives the electric signal and converts the electric signal into audio data, and outputs the audio data to the processor 780 for processing. Then, the processor 780 sends the audio data to, for example, another mobile phone by using the RF circuit 710, or outputs the audio data to the memory 720 for further processing.

Wi-Fi is a short distance wireless transmission technology. The mobile phone may help, by using the Wi-Fi module 770, the user to receive and send e-mails, browse a web page, access streaming media, and so on, which provides wireless broadband Internet access for the user. Although FIG. 16 shows the Wi-Fi module 770, it may be understood that the Wi-Fi module 870 is not a necessary component of the mobile phone, and when required, the Wi-Fi module 770 may be omitted as long as the scope of the essence of the present disclosure is not changed.

The processor 780 is the control center of the mobile phone, and is connected to various parts of the mobile phone by using various interfaces and lines. By running or executing the software program and/or module stored in the memory 720, and invoking data stored in the memory 720, the processor 780 performs various functions and data processing of the mobile phone, thereby performing overall monitoring on the mobile phone. Optionally, the processor 780 may include one or more processing units. Preferably, the processor 780 may integrate an application processor and a modem processor. The application processor mainly processes an operating system, a user interface, an application program, and the like. The modem processor mainly processes wireless communication. It may be understood that the foregoing modem processor may alternatively not be integrated into the processor 780.

The mobile phone further includes the power supply 790 (such as a battery) for supplying power to the components. Preferably, the power supply may be logically connected to the processor 780 by using a power management system, thereby implementing functions such as charging, discharging and power consumption management by using the power management system.

Although not shown in the figure, the mobile phone may further include a camera, a Bluetooth module, and the like, which are not further described herein.

In this embodiment of the present disclosure, the processor 780 included in the mobile phone further controls a process of a method executed by a terminal device in the execution of the method for obtaining a plug-in resource of a virtual object.

In the foregoing embodiments, the description of each embodiment has respective focuses. For a part that is not described in detail in an embodiment, refer to related descriptions in other embodiments.

A person skilled in the art may clearly understand that, for simple and clear description, for specific work processes of the foregoing described system, apparatus, and module, reference may be made to corresponding process in the foregoing method embodiments, and details are not described herein again.

In the several embodiments provided in the present application, it should be understood that the disclosed system, apparatus, and method may be implemented in other manners. For example, the foregoing described apparatus embodiments are merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

Each module may be implemented as hardware circuitry or a processor executing software instructions, or a combination thereof. The modules described as separate parts may or may not be physically separate, and the parts displayed as modules may or may not be physical modules, may be located in one position, or may be distributed on a plurality of network modules. A part of or all of the modules may be selected according to actual needs to achieve the objectives of the solutions of the embodiments.

In addition, functional modules in the embodiments of the present disclosure may be integrated into one processing module, or each of the modules may exist alone physically, or two or more modules may be integrated into one module. The integrated module may be implemented in a form of hardware, or may be implemented in a form of a software functional module.

If implemented in the form of software functional modules and sold or used as an independent product, the integrated modules may be stored in a computer-readable storage medium. Based on such an understanding, the technical solutions of the present disclosure essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The technical solutions provided in the present disclosure are described above in detail. Although the principles and implementations of the present disclosure are described by using various examples in this specification, the descriptions of the foregoing embodiments are merely intended to help understand the method and the core idea of the method of the present disclosure. Meanwhile, a person of ordinary skill in the art may make modifications to the specific implementations and application according to the idea of the present disclosure. In conclusion, the content of this specification should not be construed as a limit on the present disclosure.

What is claimed is:

1. A method of providing a virtual resource to a virtual object that is a gaming character in a computer game, comprising:
   identifying the virtual object that is currently operated in a virtual domain of the computer game accessed by executing a target application, the target application being installed on a user device, and the virtual object entering a battle in the virtual domain of the computer game;
   displaying on a display of the user device a gaming user interface of the computer game, the virtual object interacting with other virtual objects in the battle via the gaming user interface;
   determining a resource assisting manner of a virtual resource application for the virtual object;
   determining, by circuitry of the user device according to the determined resource assisting manner and battle situation information of the virtual object in the battle, at least one recommended virtual resource that meets an assisting condition, the assisting condition including one or more of meeting an obtaining sequence of a set of virtual resources, having sufficient account balances for the at least one recommended virtual resource, and being in a different type and a different gaming level from existing virtual resources already obtained by the virtual object;
   displaying a first icon corresponding to the resource assisting manner and a second icon corresponding to the at least one recommended virtual resource on the gaming user interface, while the virtual object remains controllable for interacting with the other virtual objects in the battle via the gaming user interface; and
   determining whether the at least one recommended virtual resource is to be obtained by the virtual object in response to an operation of the second icon displayed on the gaming user interface.

2. The method according to claim 1, wherein, after the virtual object that is currently operated in the virtual domain accessed by executing the target application is identified, the method further comprises:
   creating a first resource recommendation list according to the virtual object, the first resource recommendation list comprising at least two virtual resources, each of the virtual resources in the first resource recommendation list having a different recommendation priority that is positively correlated to a matching degree between the respective virtual resource and the virtual object; and
   after at least one target virtual resource in the first resource recommendation list is determined to meet a preset recommendation rule, sending the at least one target virtual resource to the user device according to the recommendation priority of the at least one target virtual resource.

3. The method according to claim 2, wherein, before the sending the at least one target virtual resource to the user device according to the recommendation priority of the at least one target virtual resource, the method further comprises:
: determining whether the at least one target virtual resource in the first resource recommendation list matches a virtual resource database of the virtual object; and
: when the at least one target virtual resource does not match the virtual resource database, determining that the at least one target virtual resource in the first resource recommendation list meets the preset recommendation rule.

4. The method according to claim 3, wherein the determining whether the at least one target virtual resource in the first resource recommendation list matches the virtual resource database of the virtual object comprises:
: determining whether the at least one target virtual resource exists in the virtual resource database of the virtual object, and when the at least one target virtual resource does not exist in the virtual resource database, determining that the at least one target virtual resource in the first resource recommendation list does not match the virtual resource database of the virtual object; or
: determining whether another virtual resource matching an attribute of the at least one target virtual resource exists in the virtual resource database of the virtual object, and when the another virtual resource matching the attribute does not exist in the virtual resource database, determining that the at least one target virtual resource in the first resource recommendation list does not match the virtual resource database of the virtual object.

5. The method according to claim 2, wherein, when the at least one target virtual resource comprises a first virtual resource and a second virtual resource, the sending the at least one target virtual resource to the user device according to the recommendation priorities of the at least one target virtual resource comprises:
: when the recommendation priority of the first virtual resource is determined to be greater than the recommendation priority of the second virtual resource,
: sending the first virtual resource to the user device, and
: sending the second virtual resource to the user device after the first virtual resource is determined to be added to a virtual resource database of the virtual object.

6. The method according to claim 5, wherein, before the sending the second virtual resource to the user device, the method further comprises:
: determining whether available resources in the virtual resource database of the virtual object are not less than resources required by the second virtual resource,
: when the available resources are not less than the resources required by the second virtual resource, sending the second virtual resource to the user device, and
: sending a precursory virtual resource of the second virtual resource to the user device when the available resources in the virtual resource database of the virtual object are less than the resources required by the second virtual resource, the precursory virtual resource being usable to synthesize the second virtual resource.

7. The method according to claim 1, wherein, after the displaying the first icon corresponding to the resource assisting manner and the second icon corresponding to the at least one recommended virtual resource on the gaining user interface, the method further comprises:
: traversing virtual resources that correspond to a selected resource assisting manner when an existing virtual resource of the virtual object changes; and
: when determining that there exists a target virtual resource that meets the assisting condition, adding the target virtual resource to a resource queue, and updating the resource queue.

8. The method according to claim 1, wherein, after the displaying the first icon corresponding to the resource assisting manner and the second icon corresponding to the at least one recommended virtual resource on the gaming user interface, the method further comprises:
: receiving an operation instruction of the virtual object, the operation instruction being an instruction sent by the user device when, according to updated battle situation information of the virtual object in the battle, that a currently selected resource assisting manner is determined not to be suitable for a current battle situation of the virtual object in the battle; and
: updating the resource assisting manner of the virtual object in response to the operation instruction.

9. The method according to claim 1, wherein the method further comprises:
: sending interactive data of the virtual object to a server, so that the server calculates, according to the interactive data and interactive data sent by other terminals, comprehensive parameter values corresponding to a plurality of predetermined resource assisting manners, sorts priorities of the resource assisting manners according to the comprehensive parameter values of the resource assisting manners, and sends the predetermined resource assisting manners corresponding to the comprehensive parameter values that are higher than a preset threshold to the user device,
: the interactive data comprising the virtual object, a number of wins corresponding to the resource assisting manners, winning rates corresponding to the predetermined resource assisting manners, and virtual resources obtained by the virtual object.

10. An apparatus, comprising:
: circuitry configured to:
: : identify a virtual object that is a gaming character in a computer game and currently operated in a virtual domain of the computer game accessed by executing a target application, the target application being installed on the apparatus that is a user device, and the virtual object entering a battle in the virtual domain of the computer game;
: : cause a display of the user device to display a gaming user interface of the computer game, the virtual object interacting with other virtual objects in the battle via the gaming user interface;
: : determine a resource assisting manner of a virtual resource application for the virtual object;
: : determine, according to the determined resource assisting manner and battle situation information of the virtual object in the battle, at least one recommended virtual resource that meets an assisting condition, the assisting condition including one or more of meeting an obtaining sequence of a set of virtual resources, having sufficient account balances for the at least one recommended virtual resource, and being in a different type and a different gaming level from existing virtual resources already obtained by the virtual object; and
: : cause the display to display a first icon corresponding to the resource assisting manner and a second icon corresponding to the at least one recommended virtual resource on the gaming user interface, while the virtual object remains controllable for interacting with the other virtual objects in the battle via the gaming user interface; and determine whether the at least one recommended virtual resource is to be obtained by the virtual object in response to an operation of the second icon displayed on the gaming user interface.

11. The apparatus according to claim 10, wherein the circuitry is further configured to, after the virtual object that is currently operated in the virtual domain accessed by executing the target application is identified:

create a first resource recommendation list according to the virtual object, the first resource recommendation list comprising at least two virtual resources, each of the virtual resources in the first resource recommendation list having a different recommendation priority that is positively correlated to a matching degree between the respective virtual resource and the virtual object; and after at least one target virtual resource in the first resource recommendation list is determined to meet a preset recommendation rule, send the at least one target virtual resource to the user device according to the recommendation priority of the at least one target virtual resource.

12. The apparatus according to claim 11, wherein the circuitry is further configured to, before the at least one target virtual resource is sent to the user device according to the recommendation priority of the at least one target virtual resource:

determine whether the at least one target virtual resource in the first resource recommendation list matches a virtual resource database of the virtual object; and when the at least one target virtual resource does not match the virtual resource database, determine that the at least one target virtual resource in the first resource recommendation list meets the preset recommendation rule.

13. The apparatus according to claim 12, wherein the circuitry is configured to:

determine whether the at least one target virtual resource exists in the virtual resource database of the virtual object, and when the at least one target virtual resource does not exist in the virtual resource database, determine that the at least one target virtual resource in the first resource recommendation list does not match the virtual resource database of the virtual object; or determine whether another virtual resource matching an attribute of the at least one target virtual resource exists in the virtual resource database of the virtual object, and when the another virtual resource matching the attribute does not exist in the virtual resource database, determine that the at least one target virtual resource in the first resource recommendation list does not match the virtual resource database of the virtual object.

14. The apparatus according to claim 11, wherein when the at least one target virtual resource comprises a first virtual resource and a second virtual resource, the circuitry is configured to:

when the recommendation priority of the first virtual resource is determined to be greater than the recommendation priority of the second virtual resource, send the first virtual resource to the user device, and send the second virtual resource to the user device after the first virtual resource is determined to be added to a virtual resource database of the virtual object.

15. The apparatus according to claim 14, wherein the circuitry is further configured to, before the second virtual resource is sent to the user device:

determine whether available resources in the virtual resource database of the virtual object are not less than resources required by the second virtual resource, when the available resources are not less than the resources required by the second virtual resource, send the second virtual resource to the user device, and send a precursory virtual resource of the second virtual resource to the user device when the available resource in the virtual resource database of the virtual object are less than the resources required by the second virtual resource, the precursory virtual resource being usable to synthesize the second virtual resource.

16. The apparatus according to claim 10, wherein the circuitry is further configured to, after the first icon corresponding to the resource assisting manner and the second icon corresponding to the at least one recommended virtual resource are displayed on the gaming user interface:

traverse virtual resources that correspond to a selected resource assisting manner when an existing virtual resource of the virtual object changes; and when determining that there exists a target virtual resource that meets the assisting condition, add the target virtual resource to a resource queue, and update the resource queue.

17. The apparatus according to claim 10, wherein the circuitry is further configured to, after the first icon corresponding to the resource assisting manner and the second icon corresponding to the at least one recommended virtual resource are displayed on the gaming user interface:

receive an operation instruction of the virtual object by using a transceiver, the operation instruction being an instruction sent by the user device when, according to updated battle situation information of the virtual object in the battle, that a currently selected resource assisting manner is not to be suitable for a current battle situation of the virtual object in the battle; and update the resource assisting manner of the virtual object in response to the operation instruction.

18. The apparatus according to claim 17, wherein the circuitry is further configured to:

send interactive data of the virtual object to a server, so that the server calculates, according to the interactive data and interactive data sent by other terminals, comprehensive parameter values corresponding to resource assisting manners, sorts priorities of the resource assisting manners according to the comprehensive parameter values of the resource assisting manners, and sends resource assisting manners whose comprehensive parameter values are higher than a preset threshold to the user device, the interactive data comprising the used virtual object, a number of wins corresponding to the resource assisting manners, win rates corresponding to the resource assisting manners, and virtual resources obtained by the virtual object.

19. A non-transitory computer-readable storage medium storing computer-readable instructions, which when executed by a processor of a user device, cause the user device to perform:

identifying a virtual object that is a gaming character in a computer game and currently operated in a virtual domain of the computer game accessed by executing a target application, the target application being installed on the user device, and the virtual object entering a battle in the virtual domain of the computer game;

displaying on a display of the user device a gaming user interface of the computer game, the virtual object interacting with other virtual objects in the battle via the gaming user interface;

determining a resource assisting manner of a virtual resource application for the virtual object;

determining, according to the determined resource assisting manner and battle situation information of the virtual object in the battle, at least one recommended virtual resource that meets an assisting condition, the assisting condition including one or more of meeting an obtaining sequence of a set of virtual resources, having sufficient account balances for the at least one recommended virtual resource, and being in a different type and a different gaming level from existing virtual resources already obtained by the virtual object; and displaying a first icon corresponding to the resource assisting manner and a second icon corresponding to the at least one recommended virtual resource on the gaming user interface, while the virtual object remains controllable for interacting with the other virtual objects in the battle via the gaming user interface; and determining whether the at least one recommended virtual resource is to be obtained by the virtual object in response to an operation of the second icon displayed on the gaming user interface.

20. The non-transitory computer-readable storage medium according to claim 19, wherein the computer-readable instructions, which when executed by the processor, further cause the user device to perform, after the displaying the first icon corresponding to the resource assisting manner and the second icon corresponding to the at least one recommended virtual resource on the gaming user interface, receiving an operation instruction of the virtual object, the operation instruction being an instruction sent by the user device when, according to updated battle situation information of the virtual object in the battle, that a currently selected resource assisting manner is determined not to be suitable for a current battle situation of the virtual object in the battle; and updating the resource assisting manner of the virtual object in response to the operation instruction.

* * * * *